US011659625B2

(12) United States Patent
Xiong et al.

(10) Patent No.: US 11,659,625 B2
(45) Date of Patent: *May 23, 2023

(54) METHODS TO MULTIPLEX CONTROL INFORMATION IN ACCORDANCE WITH MULTI-SLOT TRANSMISSIONS IN NEW RADIO (NR) SYSTEMS

(71) Applicant: Apple Inc., Cupertino, CA (US)

(72) Inventors: Gang Xiong, Beaverton, OR (US); Yushu Zhang, Beijing (CN); Guotong Wang, Beijing (CN)

(73) Assignee: Apple Inc., Cupertino, CA (US)

( * ) Notice: Subject to any disclaimer, the term of this patent is extended or adjusted under 35 U.S.C. 154(b) by 117 days.

This patent is subject to a terminal disclaimer.

(21) Appl. No.: 17/238,933

(22) Filed: Apr. 23, 2021

(65) Prior Publication Data
US 2021/0282227 A1 Sep. 9, 2021

Related U.S. Application Data

(63) Continuation of application No. 16/443,990, filed on Jun. 18, 2019, now Pat. No. 11,019,682.
(Continued)

(51) Int. Cl.
*H04W 88/06* (2009.01)
*H04W 72/04* (2023.01)
(Continued)

(52) U.S. Cl.
CPC ........... *H04W 88/06* (2013.01); *H04L 1/0026* (2013.01); *H04L 1/1819* (2013.01);
(Continued)

(58) Field of Classification Search
CPC ............. H04W 88/06; H04W 72/1247; H04W 72/0446; H04W 72/0413; H04W 72/1284;
(Continued)

(56) References Cited

U.S. PATENT DOCUMENTS 11,019,682 B2 * 5/2021 Xiong .................. H04L 1/1819
2017/0223694 A1 8/2017 Han et al.
(Continued)

OTHER PUBLICATIONS

"Physical layer procedures for data", 3GPP TS 38-214 V15.0.0, (Oct. 2018), 99 pgs.

*Primary Examiner* — Steven H Nguyen
(74) *Attorney, Agent, or Firm* — Kowert, Hood, Munyon, Rankin & Goetzel, P.C.

(57) ABSTRACT

Embodiments of a User Equipment (UE), Next Generation Node-B (gNB) and methods of communication are generally described herein. The UE may receive control signaling to configure transmission of: a first physical uplink control channel (PUCCH) that includes first uplink control information (UCI) of a first UCI type; and a second PUCCH that includes second UCI of a second UCI type. In some cases, if the transmissions of the first PUCCH and the second PUCCH would overlap in a number of slots, the UE may, if the first and second UCI types are not of the same priority: transmit, in the overlapping slots, the PUCCH that includes the UCI type of highest priority; and refrain from transmission in the overlapping slots, and without postponement of the transmission, of the PUCCH that includes the UCI type of lowest priority.

20 Claims, 15 Drawing Sheets

Related U.S. Application Data

(60) Provisional application No. 62/686,471, filed on Jun. 18, 2018.

(51) Int. Cl.
*H04W 72/0446* (2023.01)
*H04L 1/00* (2006.01)
*H04L 1/1812* (2023.01)
*H04L 5/00* (2006.01)
*H04W 72/12* (2023.01)

(52) U.S. Cl.
CPC ....... *H04L 5/0055* (2013.01); *H04W 72/0413* (2013.01); *H04W 72/0446* (2013.01); *H04W 72/1247* (2013.01)

(58) Field of Classification Search
CPC ............. H04W 72/1242; H04L 5/0055; H04L 1/1819; H04L 1/0026; H04L 1/1664; H04L 1/1854
See application file for complete search history.

(56) References Cited

U.S. PATENT DOCUMENTS

| | | | |
|---|---|---|---|
| 2019/0239216 A1 | 8/2019 | Kundu et al. | |
| 2019/0261391 A1* | 8/2019 | Kundu | H04W 72/0446 |
| 2019/0306921 A1 | 10/2019 | Wang et al. | |
| 2019/0349922 A1* | 11/2019 | Xu | H04W 72/0413 |
| 2020/0146028 A1 | 5/2020 | Fang et al. | |
| 2021/0007119 A1 | 1/2021 | Li et al. | |

\* cited by examiner

1000

1100

1400

1500

1600

1700

METHODS TO MULTIPLEX CONTROL INFORMATION IN ACCORDANCE WITH MULTI-SLOT TRANSMISSIONS IN NEW RADIO (NR) SYSTEMS

PRIORITY CLAIM

This application is a continuation of U.S. patent application Ser. No. 16/443,990, (now issued as U.S. Pat. No. 11,019,682), filed Jun. 18, 2019, which claims priority under 35 USC 119(e) to U.S. Provisional Patent Application Ser. No. 62/686,471, filed Jun. 18, 2018, which are incorporated herein by reference in their entirety.

The claims in the instant application are different than those of the parent application and/or other related applications. The Applicant therefore rescinds any disclaimer of claim scope made in the parent application and/or any predecessor application in relation to the instant application. Any such previous disclaimer and the cited references that it was made to avoid, may need to be revisited. Further, any disclaimer made in the instant application should not be read into or against the parent application and/or other related applications.

TECHNICAL FIELD

Embodiments pertain to wireless networks. Some embodiments relate to cellular communication networks including 3GPP (Third Generation Partnership Project) networks, 3GPP LTE (Long Term Evolution) networks, 3GPP LTE-A (LTE Advanced) networks, New Radio (NR) networks, and 5G networks, although the scope of the embodiments is not limited in this respect. Some embodiments relate to multiplexing of control information in accordance with multi-slot transmissions.

BACKGROUND

Efficient use of the resources of a wireless network is important to provide bandwidth and acceptable response times to the users of the wireless network. However, often there are many devices trying to share the same resources and some devices may be limited by the communication protocol they use or by their hardware bandwidth. Moreover, wireless devices may need to operate with both newer protocols and with legacy device protocols.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1A:
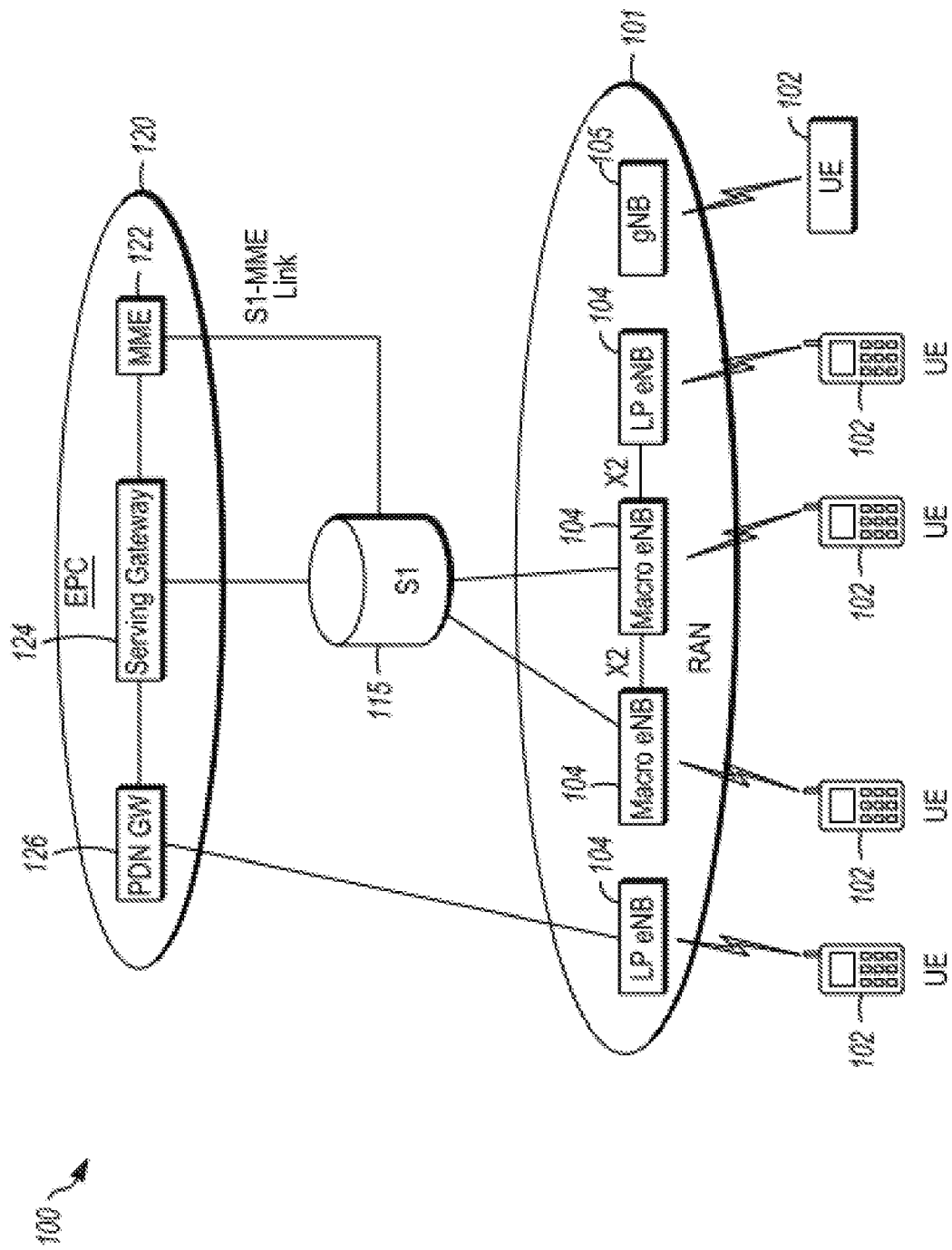
FIG. 1A is a functional diagram of an example network in accordance with some embodiments.
Figure 1B:
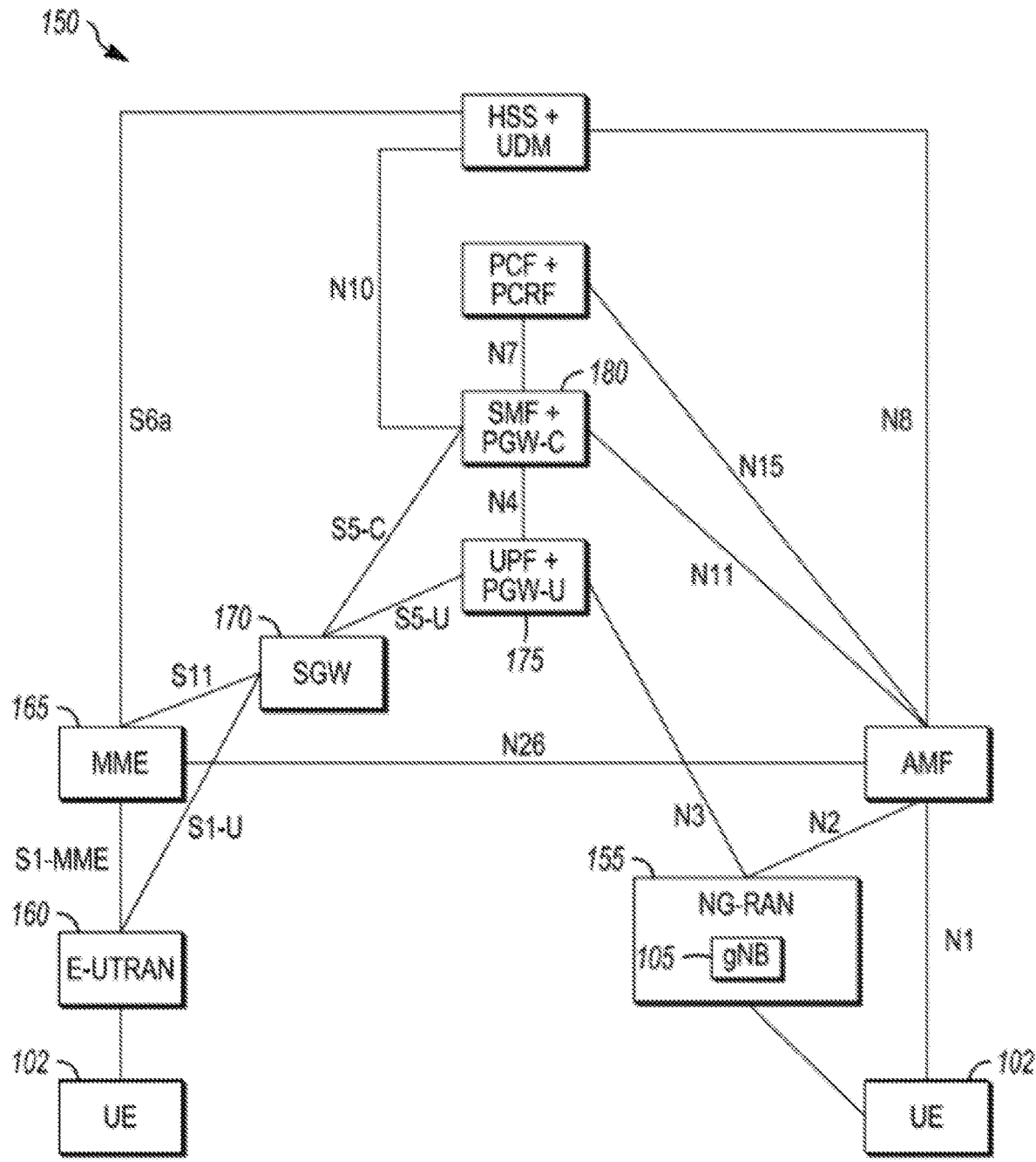
FIG. 1B is a functional diagram of another example network in accordance with some embodiments.

FIG. 1A is a functional diagram of an example network in accordance with some embodiments. FIG. 1B is a functional diagram of another example network in accordance with some embodiments. In references herein, "FIG. 1" may include FIG. 1A and FIG. 1B. In some embodiments, the network 100 may be a Third Generation Partnership Project (3GPP) network. In some embodiments, the network 150 may be a 3GPP network. In a non-limiting example, the network 150 may be a new radio (NR) network. It should be noted that embodiments are not limited to usage of 3GPP networks, however, as other networks may be used in some embodiments. As an example, a Fifth Generation (5G) network may be used in some cases. As another example, a New Radio (NR) network may be used in some cases. As another example, a wireless local area network (WLAN) may be used in some cases. Embodiments are not limited to these example networks, however, as other networks may be used in some embodiments. In some embodiments, a network may include one or more components shown in FIG. 1A. Some embodiments may not necessarily include all components shown in FIG. 1A, and some embodiments may include additional components not shown in FIG. 1A. In some embodiments, a network may include one or more components shown in FIG. 1B. Some embodiments may not necessarily include all components shown in FIG. 1B, and some embodiments may include additional components not shown in FIG. 1B. In some embodiments, a network may include one or more components shown in FIG. 1A and one or more components shown in FIG. 1B. In some embodiments, a network may include one or more components shown in FIG. 1A, one or more components shown in FIG. 1B and one or more additional components.

The network 100 may comprise a radio access network (RAN) 101 and the core network 120 (e.g., shown as an evolved packet core (EPC)) coupled together through an S1 interface 115. For convenience and brevity sake, only a portion of the core network 120, as well as the RAN 101, is shown. In a non-limiting example, the RAN 101 may be an evolved universal terrestrial radio access network (E-UTRAN). In another non-limiting example, the RAN 101 may include one or more components of a New Radio (NR) network. In another non-limiting example, the RAN 101 may include one or more components of an E-UTRAN and one or more components of another network (including but not limited to an NR network).

The core network 120 may include a mobility management entity (MME) 122, a serving gateway (serving GW) 124, and packet data network gateway (PDN GW) 126. In some embodiments, the network 100 may include (and/or support) one or more Evolved Node-B's (eNBs) 104 (which may operate as base stations) for communicating with User Equipment (UE) 102. The eNBs 104 may include macro eNBs and low power (LP) eNBs, in some embodiments.

In some embodiments, the network 100 may include (and/or support) one or more Next Generation Node-B's (gNBs) 105. In some embodiments, one or more eNBs 104 may be configured to operate as gNBs 105. Embodiments are not limited to the number of eNBs 104 shown in FIG. 1A or to the number of gNBs 105 shown in FIG. 1A. In some embodiments, the network 100 may not necessarily include eNBs 104. Embodiments are also not limited to the connectivity of components shown in FIG. 1A.

It should be noted that references herein to an eNB 104 or to a gNB 105 are not limiting. In some embodiments, one or more operations, methods and/or techniques (such as those described herein) may be practiced by a base station component (and/or other component), including but not limited to a gNB 105, an eNB 104, a serving cell, a transmit receive point (TRP) and/or other. In some embodiments, the base station component may be configured to operate in accordance with a New Radio (NR) protocol and/or NR standard, although the scope of embodiments is not limited in this respect. In some embodiments, the base station component may be configured to operate in accordance with a Fifth Generation (5G) protocol and/or 5G standard, although the scope of embodiments is not limited in this respect.

In some embodiments, one or more of the UEs 102, gNBs 105, and/or eNBs 104 may be configured to operate in accordance with an NR protocol and/or NR techniques. References to a UE 102, eNB 104, and/or gNB 105 as part of descriptions herein are not limiting. For instance, descriptions of one or more operations, techniques and/or methods practiced by a gNB 105 are not limiting. In some embodiments, one or more of those operations, techniques and/or methods may be practiced by an eNB 104 and/or other base station component.

In some embodiments, the UE 102 may transmit signals (data, control and/or other) to the gNB 105, and may receive signals (data, control and/or other) from the gNB 105. In some embodiments, the UE 102 may transmit signals (data, control and/or other) to the eNB 104, and may receive signals (data, control and/or other) from the eNB 104. These embodiments will be described in more detail below.

The MME 122 is similar in function to the control plane of legacy Serving GPRS Support Nodes (SGSN). The MME 122 manages mobility aspects in access such as gateway selection and tracking area list management. The serving GW 124 terminates the interface toward the RAN 101, and routes data packets between the RAN 101 and the core network 120. In addition, it may be a local mobility anchor point for inter-eNB handovers and also may provide an anchor for inter-3GPP mobility. Other responsibilities may include lawful intercept, charging, and some policy enforcement. The serving GW 124 and the MME 122 may be implemented in one physical node or separate physical nodes. The PDN GW 126 terminates an SGi interface toward the packet data network (PDN). The PDN GW 126 routes data packets between the EPC 120 and the external PDN, and may be a key node for policy enforcement and charging data collection. It may also provide an anchor point for mobility with non-LTE accesses. The external PDN can be any kind of IP network, as well as an IP Multimedia Subsystem (IMS) domain. The PDN GW 126 and the serving GW 124 may be implemented in one physical node or separated physical nodes.

In some embodiments, the eNBs 104 (macro and micro) terminate the air interface protocol and may be the first point of contact for a UE 102. In some embodiments, an eNB 104 may fulfill various logical functions for the network 100, including but not limited to RNC (radio network controller functions) such as radio bearer management, uplink and downlink dynamic radio resource management and data packet scheduling, and mobility management.

In some embodiments, UEs 102 may be configured to communicate Orthogonal Frequency Division Multiplexing (OFDM) communication signals with an eNB 104 and/or gNB 105 over a multicarrier communication channel in accordance with an Orthogonal Frequency Division Multiple Access (OFDMA) communication technique. In some embodiments, eNBs 104 and/or gNBs 105 may be configured to communicate OFDM communication signals with a UE 102 over a multicarrier communication channel in accordance with an OFDMA communication technique. The OFDM signals may comprise a plurality of orthogonal subcarriers.

The S1 interface 115 is the interface that separates the RAN 101 and the EPC 120. It may be split into two parts: the S1-U, which carries traffic data between the eNBs 104 and the serving GW 124, and the S1-MME, which is a signaling interface between the eNBs 104 and the MME 122. The X2 interface is the interface between eNBs 104. The X2 interface comprises two parts, the X2-C and X2-U. The X2-C is the control plane interface between the eNBs 104, while the X2-U is the user plane interface between the eNBs 104.

In some embodiments, similar functionality and/or connectivity described for the eNB 104 may be used for the gNB 105, although the scope of embodiments is not limited in this respect. In a non-limiting example, the S1 interface 115 (and/or similar interface) may be split into two parts: the S1-U, which carries traffic data between the gNBs 105 and the serving GW 124, and the S1-MME, which is a signaling interface between the gNBs 105 and the MME 122. The X2 interface (and/or similar interface) may enable communication between eNBs 104, communication between gNBs 105 and/or communication between an eNB 104 and a gNB 105.

With cellular networks, LP cells are typically used to extend coverage to indoor areas where outdoor signals do not reach well, or to add network capacity in areas with very dense phone usage, such as train stations. As used herein, the term low power (LP) eNB refers to any suitable relatively low power eNB for implementing a narrower cell (narrower than a macro cell) such as a femtocell, a picocell, or a micro cell. Femtocell eNBs are typically provided by a mobile network operator to its residential or enterprise customers. A femtocell is typically the size of a residential gateway or smaller and generally connects to the user's broadband line. Once plugged in, the femtocell connects to the mobile operator's mobile network and provides extra coverage in a range of typically 30 to 50 meters for residential femtocells. Thus, a LP eNB might be a femtocell eNB since it is coupled through the PDN GW 126. Similarly, a picocell is a wireless communication system typically covering a small area, such as in-building (offices, shopping malls, train stations, etc.), or more recently in-aircraft. A picocell eNB can generally connect through the X2 link to another eNB such as a macro eNB through its base station controller (BSC) functionality. Thus, LP eNB may be implemented with a picocell eNB since it is coupled to a macro eNB via an X2 interface. Picocell eNBs or other LP eNBs may incorporate some or all functionality of a macro eNB. In some cases, this may be referred to as an access point base station or enterprise femtocell. In some embodiments, various types of gNBs 105 may be used, including but not limited to one or more of the eNB types described above.

In some embodiments, the network 150 may include one or more components configured to operate in accordance with one or more 3GPP standards, including but not limited to an NR standard. The network 150 shown in FIG. 1B may include a next generation RAN (NG-RAN) 155, which may include one or more gNBs 105. In some embodiments, the network 150 may include the E-UTRAN 160, which may include one or more eNBs. The E-UTRAN 160 may be similar to the RAN 101 described herein, although the scope of embodiments is not limited in this respect.

In some embodiments, the network 150 may include the MME 165. The MME 165 may be similar to the MME 122 described herein, although the scope of embodiments is not limited in this respect. The MME 165 may perform one or more operations or functionality similar to those described herein regarding the MME 122, although the scope of embodiments is not limited in this respect.

In some embodiments, the network 150 may include the SGW 170. The SGW 170 may be similar to the SGW 124 described herein, although the scope of embodiments is not limited in this respect. The SGW 170 may perform one or more operations or functionality similar to those described herein regarding the SGW 124, although the scope of embodiments is not limited in this respect.

In some embodiments, the network 150 may include component(s) and/or module(s) for functionality for a user plane function (UPF) and user plane functionality for PGW (PGW-U), as indicated by 175. In some embodiments, the network 150 may include component(s) and/or module(s) for functionality for a session management function (SMF) and control plane functionality for PGW (PGW-C), as indicated by 180. In some embodiments, the component(s) and/or module(s) indicated by 175 and/or 180 may be similar to the PGW 126 described herein, although the scope of embodiments is not limited in this respect. The component(s) and/or module(s) indicated by 175 and/or 180 may perform one or more operations or functionality similar to those described herein regarding the PGW 126, although the scope of embodiments is not limited in this respect. One or both of the components 170, 172 may perform at least a portion of the functionality described herein for the PGW 126, although the scope of embodiments is not limited in this respect.

Embodiments are not limited to the number or type of components shown in FIG. 1B. Embodiments are also not limited to the connectivity of components shown in FIG. 1B.

In some embodiments, a downlink resource grid may be used for downlink transmissions from an eNB 104 to a UE 102, while uplink transmission from the UE 102 to the eNB 104 may utilize similar techniques. In some embodiments, a downlink resource grid may be used for downlink transmissions from a gNB 105 to a UE 102, while uplink transmission from the UE 102 to the gNB 105 may utilize similar techniques. The grid may be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid correspond to one OFDM symbol and one OFDM subcarrier, respectively. The duration of the resource grid in the time domain corresponds to one slot in a radio frame. The smallest time-frequency unit in a resource grid is denoted as a resource element (RE). There are several different physical downlink channels that are conveyed using such resource blocks. With particular relevance to this disclosure, two of these physical downlink channels are the physical downlink shared channel and the physical downlink control channel.

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware. Embodiments described herein may be implemented into a system using any suitably configured hardware and/or software.

Figure 2:
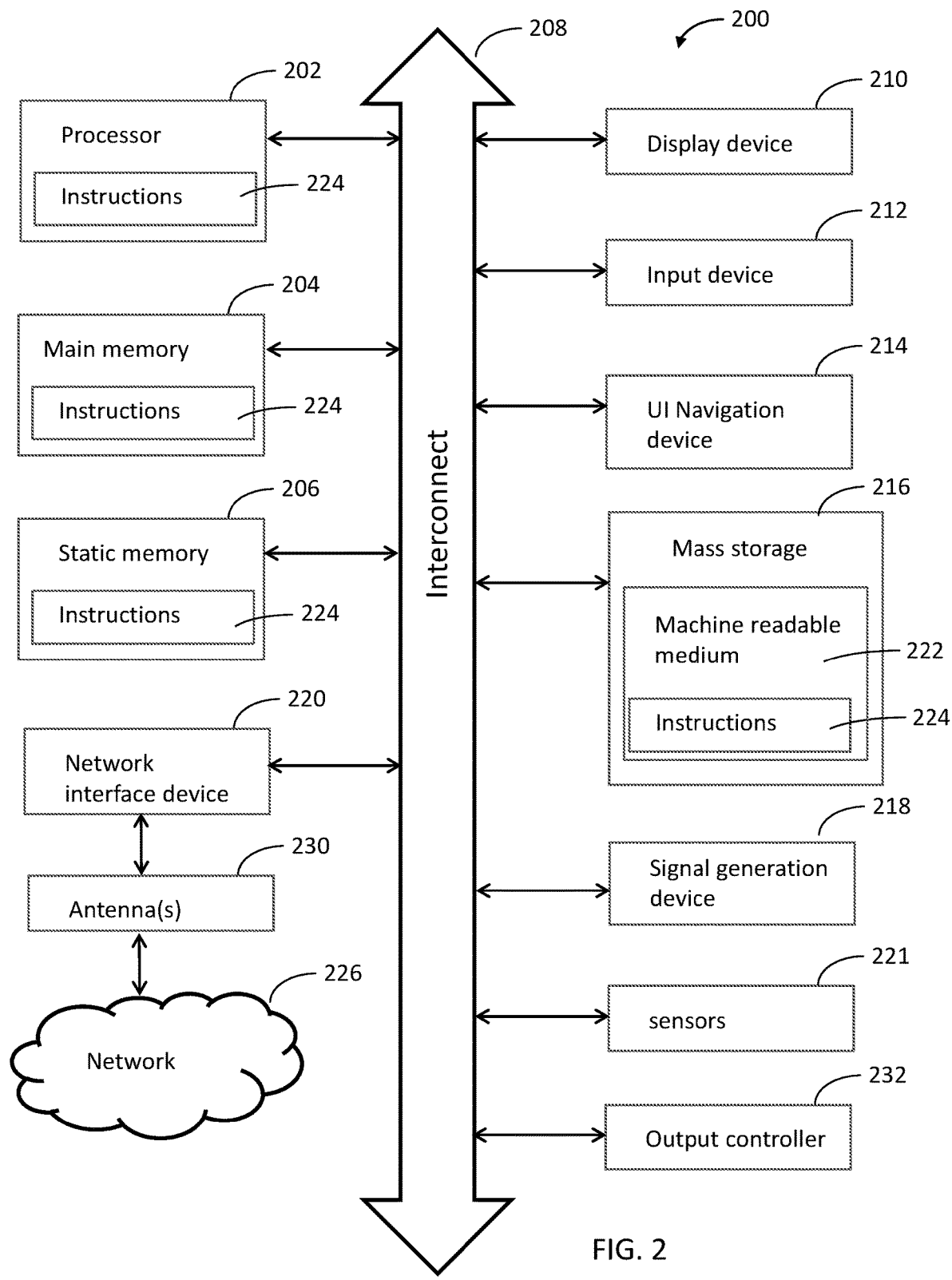
FIG. 2 illustrates a block diagram of an example machine in accordance with some embodiments.

FIG. 2 illustrates a block diagram of an example machine in accordance with some embodiments. The machine 200 is an example machine upon which any one or more of the techniques and/or methodologies discussed herein may be performed. In alternative embodiments, the machine 200 may operate as a standalone device or may be connected (e.g., networked) to other machines. In a networked deployment, the machine 200 may operate in the capacity of a server machine, a client machine, or both in server-client network environments. In an example, the machine 200 may act as a peer machine in peer-to-peer (P2P) (or other distributed) network environment. The machine 200 may be a UE 102, eNB 104, gNB 105, access point (AP), station (STA), user, device, mobile device, base station, personal computer (PC), a tablet PC, a set-top box (STB), a personal digital assistant (PDA), a mobile telephone, a smart phone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

The machine (e.g., computer system) 200 may include a hardware processor 202 (e.g., a central processing unit (CPU), a graphics processing unit (GPU), a hardware processor core, or any combination thereof), a main memory 204 and a static memory 206, some or all of which may communicate with each other via an interlink (e.g., bus) 208. The machine 200 may further include a display unit 210, an alphanumeric input device 212 (e.g., a keyboard), and a user interface (UI) navigation device 214 (e.g., a mouse). In an example, the display unit 210, input device 212 and UI navigation device 214 may be a touch screen display. The machine 200 may additionally include a storage device (e.g., drive unit) 216, a signal generation device 218 (e.g., a speaker), a network interface device 220, and one or more sensors 221, such as a global positioning system (GPS) sensor, compass, accelerometer, or other sensor. The machine 200 may include an output controller 228, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 216 may include a machine readable medium 222 on which is stored one or more sets of data structures or instructions 224 (e.g., software) embodying or utilized by any one or more of the techniques or functions described herein. The instructions 224 may also reside, completely or at least partially, within the main memory 204, within static memory 206, or within the hardware processor 202 during execution thereof by the machine 200. In an example, one or any combination of the hardware processor 202, the main memory 204, the static memory 206, or the storage device 216 may constitute machine readable media. In some embodiments, the machine readable medium may be or may include a non-transitory computer-readable storage medium. In some embodiments, the machine readable medium may be or may include a computer-readable storage medium.

While the machine readable medium 222 is illustrated as a single medium, the term "machine readable medium" may include a single medium or multiple media (e.g., a centralized or distributed database, and/or associated caches and servers) configured to store the one or more instructions 224. The term "machine readable medium" may include any medium that is capable of storing, encoding, or carrying instructions for execution by the machine 200 and that cause the machine 200 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks. In some examples, machine readable media may include non-transitory machine readable media. In some examples, machine readable media may include machine readable media that is not a transitory propagating signal.

The instructions 224 may further be transmitted or received over a communications network 226 using a transmission medium via the network interface device 220 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others. In an example, the network interface device 220 may include one or more physical jacks (e.g., Ethernet, coaxial, or phone jacks) or one or more antennas to connect to the communications network 226. In an example, the network interface device 220 may include a plurality of antennas to wirelessly communicate using at least one of single-input multiple-output (SIMO), multiple-input multiple-output (MIMO), or multiple-input single-output (MISO) techniques. In some examples, the network interface device 220 may wirelessly communicate using Multiple User MIMO techniques. The term "transmission medium" shall be taken to include any intangible medium that is capable of storing, encoding or carrying instructions for execution by the machine 200, and includes digital or analog communications signals or other intangible medium to facilitate communication of such software.

Figure 3:
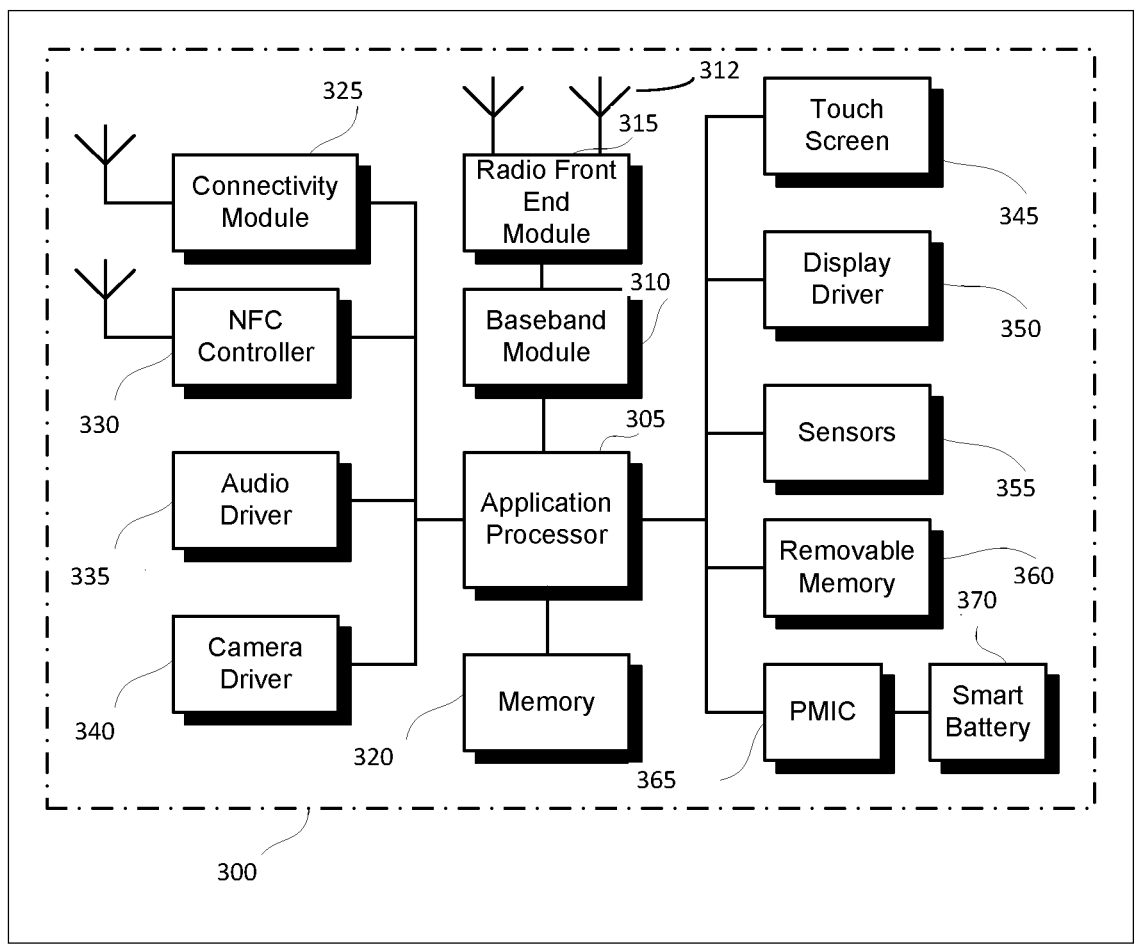
FIG. 3 illustrates a user device in accordance with some aspects.

FIG. 3 illustrates a user device in accordance with some aspects. In some embodiments, the user device 300 may be a mobile device. In some embodiments, the user device 300 may be or may be configured to operate as a User Equipment (UE). In some embodiments, the user device 300 may be arranged to operate in accordance with a new radio (NR) protocol. In some embodiments, the user device 300 may be arranged to operate in accordance with a Third Generation Partnership Protocol (3GPP) protocol. The user device 300 may be suitable for use as a UE 102 as depicted in FIG. 1, in some embodiments. It should be noted that in some embodiments, a UE, an apparatus of a UE, a user device or an apparatus of a user device may include one or more of the components shown in one or more of FIGS. 2, 3, and 5. In some embodiments, such a UE, user device and/or apparatus may include one or more additional components.

In some aspects, the user device 300 may include an application processor 305, baseband processor 310 (also referred to as a baseband module), radio front end module (RFEM) 315, memory 320, connectivity module 325, near field communication (NFC) controller 330, audio driver 335, camera driver 340, touch screen 345, display driver 350, sensors 355, removable memory 360, power management integrated circuit (PMIC) 365 and smart battery 370. In some aspects, the user device 300 may be a User Equipment (UE).

In some aspects, application processor 305 may include, for example, one or more CPU cores and one or more of cache memory, low drop-out voltage regulators (LDOs), interrupt controllers, serial interfaces such as serial peripheral interface (SPI), inter-integrated circuit ($I^2C$) or universal programmable serial interface module, real time clock (RTC), timer-counters including interval and watchdog timers, general purpose input-output (IO), memory card controllers such as secure digital/multi-media card (SD/MMC) or similar, universal serial bus (USB) interfaces, mobile industry processor interface (MIPI) interfaces and Joint Test Access Group (JTAG) test access ports.

In some aspects, baseband module 310 may be implemented, for example, as a solder-down substrate including one or more integrated circuits, a single packaged integrated circuit soldered to a main circuit board, and/or a multi-chip module containing two or more integrated circuits.

Figure 4:
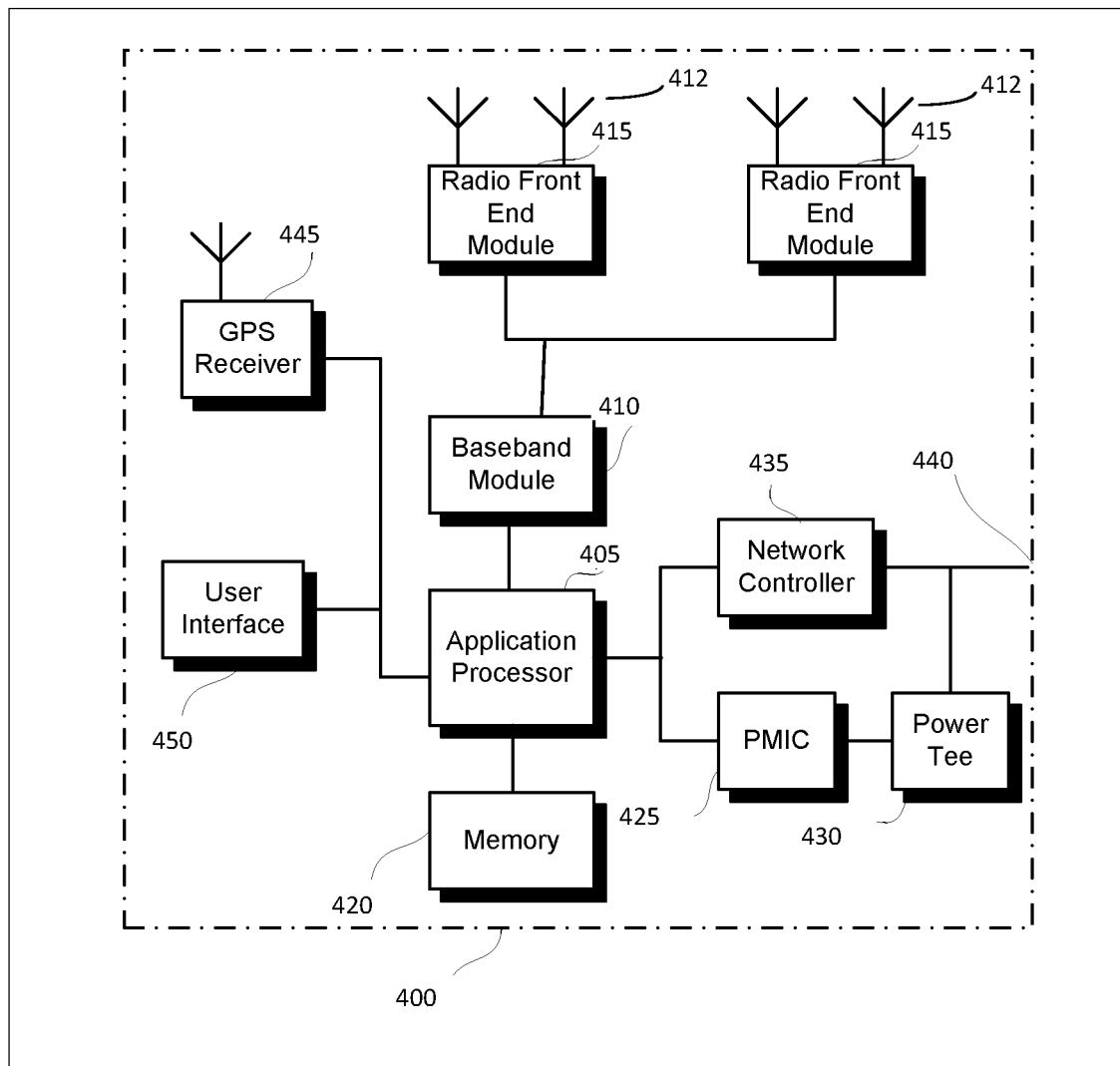
FIG. 4 illustrates a base station in accordance with some aspects.

FIG. 4 illustrates a base station in accordance with some aspects. In some embodiments, the base station 400 may be or may be configured to operate as an Evolved Node-B (eNB). In some embodiments, the base station 400 may be or may be configured to operate as a Next Generation Node-B (gNB). In some embodiments, the base station 400 may be arranged to operate in accordance with a new radio (NR) protocol. In some embodiments, the base station 400 may be arranged to operate in accordance with a Third Generation Partnership Protocol (3GPP) protocol. It should be noted that in some embodiments, the base station 400 may be a stationary non-mobile device. The base station 400 may be suitable for use as an eNB 104 as depicted in FIG. 1, in some embodiments. The base station 400 may be suitable for use as a gNB 105 as depicted in FIG. 1, in some embodiments. It should be noted that in some embodiments, an eNB, an apparatus of an eNB, a gNB, an apparatus of a gNB, a base station and/or an apparatus of a base station may include one or more of the components shown in one or more of FIGS. 2, 4, and 5. In some embodiments, such an eNB, gNB, base station and/or apparatus may include one or more additional components.

FIG. 4 illustrates a base station or infrastructure equipment radio head 400 in accordance with some aspects. The base station 400 may include one or more of application processor 405, baseband modules 410, one or more radio front end modules 415, memory 420, power management circuitry 425, power tee circuitry 430, network controller 435, network interface connector 440, satellite navigation receiver module 445, and user interface 450. In some aspects, the base station 400 may be an Evolved Node-B (eNB), which may be arranged to operate in accordance with a 3GPP protocol, new radio (NR) protocol and/or Fifth Generation (5G) protocol. In some aspects, the base station 400 may be a Next Generation Node-B (gNB), which may be arranged to operate in accordance with a 3GPP protocol, new radio (NR) protocol and/or Fifth Generation (5G) protocol.

In some aspects, application processor 405 may include one or more CPU cores and one or more of cache memory, low drop-out voltage regulators (LDOs), interrupt controllers, serial interfaces such as SPI, $I^2C$ or universal programmable serial interface module, real time clock (RTC), timer-counters including interval and watchdog timers, general purpose TO, memory card controllers such as SD/MMC or similar, USB interfaces, MIPI interfaces and Joint Test Access Group (JTAG) test access ports.

In some aspects, baseband processor 410 may be implemented, for example, as a solder-down substrate including one or more integrated circuits, a single packaged integrated circuit soldered to a main circuit board or a multi-chip module containing two or more integrated circuits.

In some aspects, memory 420 may include one or more of volatile memory including dynamic random access memory (DRAM) and/or synchronous dynamic random access memory (SDRAM), and nonvolatile memory (NVM) including high-speed electrically erasable memory (commonly referred to as Flash memory), phase change random access memory (PRAM), magneto-resistive random access memory (MRAM) and/or a three-dimensional cross-point memory. Memory 420 may be implemented as one or more of solder down packaged integrated circuits, socketed memory modules and plug-in memory cards.

In some aspects, power management integrated circuitry 425 may include one or more of voltage regulators, surge protectors, power alarm detection circuitry and one or more backup power sources such as a battery or capacitor. Power alarm detection circuitry may detect one or more of brown out (under-voltage) and surge (over-voltage) conditions.

In some aspects, power tee circuitry 430 may provide for electrical power drawn from a network cable to provide both power supply and data connectivity to the base station 400 using a single cable. In some aspects, network controller 435 may provide connectivity to a network using a standard network interface protocol such as Ethernet. Network connectivity may be provided using a physical connection which is one of electrical (commonly referred to as copper interconnect), optical or wireless.

In some aspects, satellite navigation receiver module 445 may include circuitry to receive and decode signals transmitted by one or more navigation satellite constellations such as the global positioning system (GPS), Globalnaya Navigatsionnaya Sputnikovaya Sistema (GLONASS), Galileo and/or BeiDou. The receiver 445 may provide data to application processor 405 which may include one or more of position data or time data. Application processor 405 may use time data to synchronize operations with other radio base stations. In some aspects, user interface 450 may include one or more of physical or virtual buttons, such as a reset button, one or more indicators such as light emitting diodes (LEDs) and a display screen.

Figure 5:
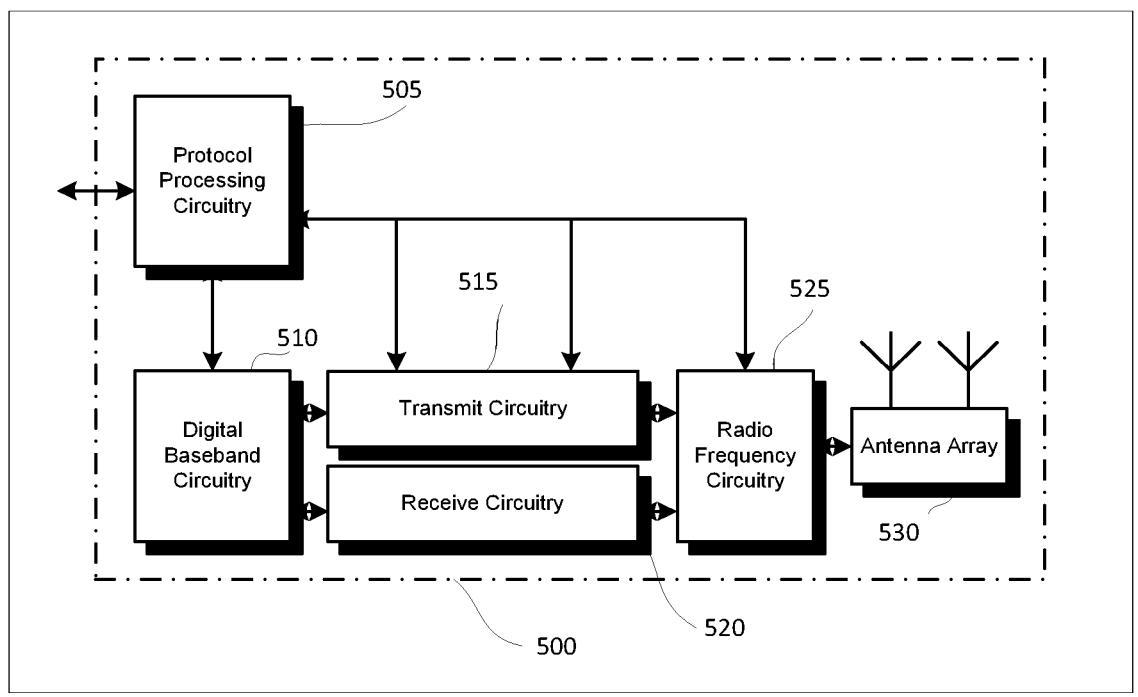
FIG. 5 illustrates an exemplary communication circuitry according to some aspects.

FIG. 5 illustrates an exemplary communication circuitry according to some aspects. Circuitry 500 is alternatively grouped according to functions. Components as shown in 500 are shown here for illustrative purposes and may include other components not shown here in FIG. 5. In some aspects, the communication circuitry 500 may be used for millimeter wave communication, although aspects are not limited to millimeter wave communication. Communication at any suitable frequency may be performed by the communication circuitry 500 in some aspects.

It should be noted that a device, such as a UE 102, eNB 104, gNB 105, the user device 300, the base station 400, the machine 200 and/or other device may include one or more components of the communication circuitry 500, in some aspects.

The communication circuitry 500 may include protocol processing circuitry 505, which may implement one or more of medium access control (MAC), radio link control (RLC), packet data convergence protocol (PDCP), radio resource control (RRC) and non-access stratum (NAS) functions. Protocol processing circuitry 505 may include one or more processing cores (not shown) to execute instructions and one or more memory structures (not shown) to store program and data information.

The communication circuitry 500 may further include digital baseband circuitry 510, which may implement physical layer (PHY) functions including one or more of hybrid automatic repeat request (HARM) functions, scrambling and/or descrambling, coding and/or decoding, layer mapping and/or de-mapping, modulation symbol mapping, received symbol and/or bit metric determination, multi-antenna port pre-coding and/or decoding which may include one or more of space-time, space-frequency or spatial coding, reference signal generation and/or detection, preamble sequence generation and/or decoding, synchronization sequence generation and/or detection, control channel signal blind decoding, and other related functions.

The communication circuitry 500 may further include transmit circuitry 515, receive circuitry 520 and/or antenna array circuitry 530. The communication circuitry 500 may further include radio frequency (RF) circuitry 525. In an aspect of the disclosure, RF circuitry 525 may include multiple parallel RF chains for one or more of transmit or receive functions, each connected to one or more antennas of the antenna array 530.

In an aspect of the disclosure, protocol processing circuitry 505 may include one or more instances of control circuitry (not shown) to provide control functions for one or more of digital baseband circuitry 510, transmit circuitry 515, receive circuitry 520, and/or radio frequency circuitry 525.

In some embodiments, processing circuitry may perform one or more operations described herein and/or other operation(s). In a non-limiting example, the processing circuitry may include one or more components such as the processor 202, application processor 305, baseband module 310, application processor 405, baseband module 410, protocol processing circuitry 505, digital baseband circuitry 510, similar component(s) and/or other component(s).

In some embodiments, a transceiver may transmit one or more elements (including but not limited to those described herein) and/or receive one or more elements (including but not limited to those described herein). In a non-limiting example, the transceiver may include one or more components such as the radio front end module 315, radio front end module 415, transmit circuitry 515, receive circuitry 520, radio frequency circuitry 525, similar component(s) and/or other component(s).

One or more antennas (such as 230, 312, 412, 530 and/or others) may comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, one or more of the antennas (such as 230, 312, 412, 530 and/or others) may be effectively separated to take advantage of spatial diversity and the different channel characteristics that may result.

In some embodiments, the UE 102, eNB 104, gNB 105, user device 300, base station 400, machine 200 and/or other device described herein may be a mobile device and/or portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a wearable device such as a medical device (e.g., a heart rate monitor, a blood pressure monitor, etc.), or other device that may receive and/or transmit information wirelessly. In some embodiments, the UE 102, eNB 104, gNB 105, user device 300, base station 400, machine 200 and/or other device described herein may be configured to operate in accordance with 3GPP standards, although the scope of the embodiments is not limited in this respect. In some embodiments, the UE 102, eNB 104, gNB 105, user device 300, base station 400, machine 200 and/or other device described herein may be configured to operate in accordance with new radio (NR) standards, although the scope of the embodiments is not limited in this respect. In some embodiments, the UE 102, eNB 104, gNB 105, user device 300, base station 400, machine 200 and/or other device described herein may be configured to operate according to other protocols or standards, including IEEE 802.11 or other IEEE standards. In some embodiments, the UE 102, eNB 104, gNB 105, user device 300, base station 400, machine 200 and/or other device described herein may include one or more of a keyboard, a display, a non-volatile memory port, multiple antennas, a graphics processor, an application processor, speakers, and other mobile device elements. The display may be an LCD screen including a touch screen.

Although the UE 102, eNB 104, gNB 105, user device 300, base station 400, machine 200 and/or other device described herein may each be illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

Embodiments may be implemented in one or a combination of hardware, firmware and software. Embodiments may also be implemented as instructions stored on a computer-readable storage device, which may be read and executed by at least one processor to perform the operations described herein. A computer-readable storage device may include any non-transitory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. Some embodiments may include one or more processors and may be configured with instructions stored on a computer-readable storage device.

It should be noted that in some embodiments, an apparatus of the UE 102, eNB 104, gNB 105, machine 200, user device 300 and/or base station 400 may include various components shown in FIGS. 2-5. Accordingly, techniques and operations described herein that refer to the UE 102 may be applicable to an apparatus of a UE. In addition, techniques and operations described herein that refer to the eNB 104 may be applicable to an apparatus of an eNB. In addition, techniques and operations described herein that refer to the gNB 105 may be applicable to an apparatus of a gNB.

Figure 6:
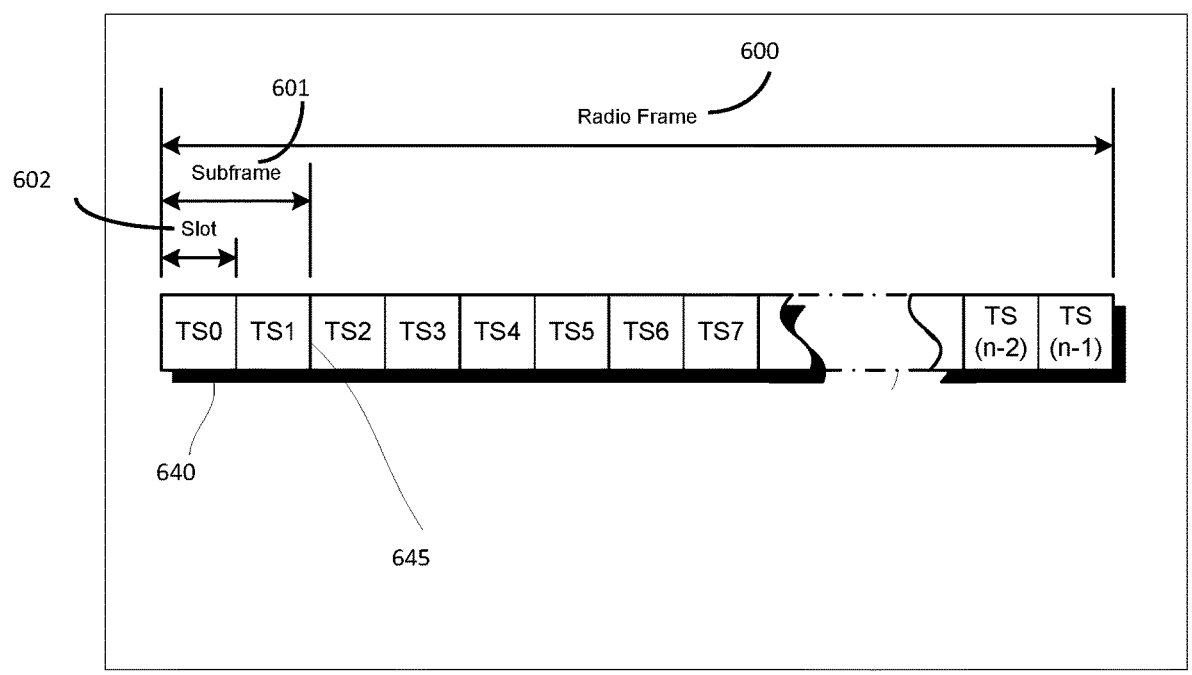
FIG. 6 illustrates an example of a radio frame structure in accordance with some embodiments.
Figures 7A, 7B:
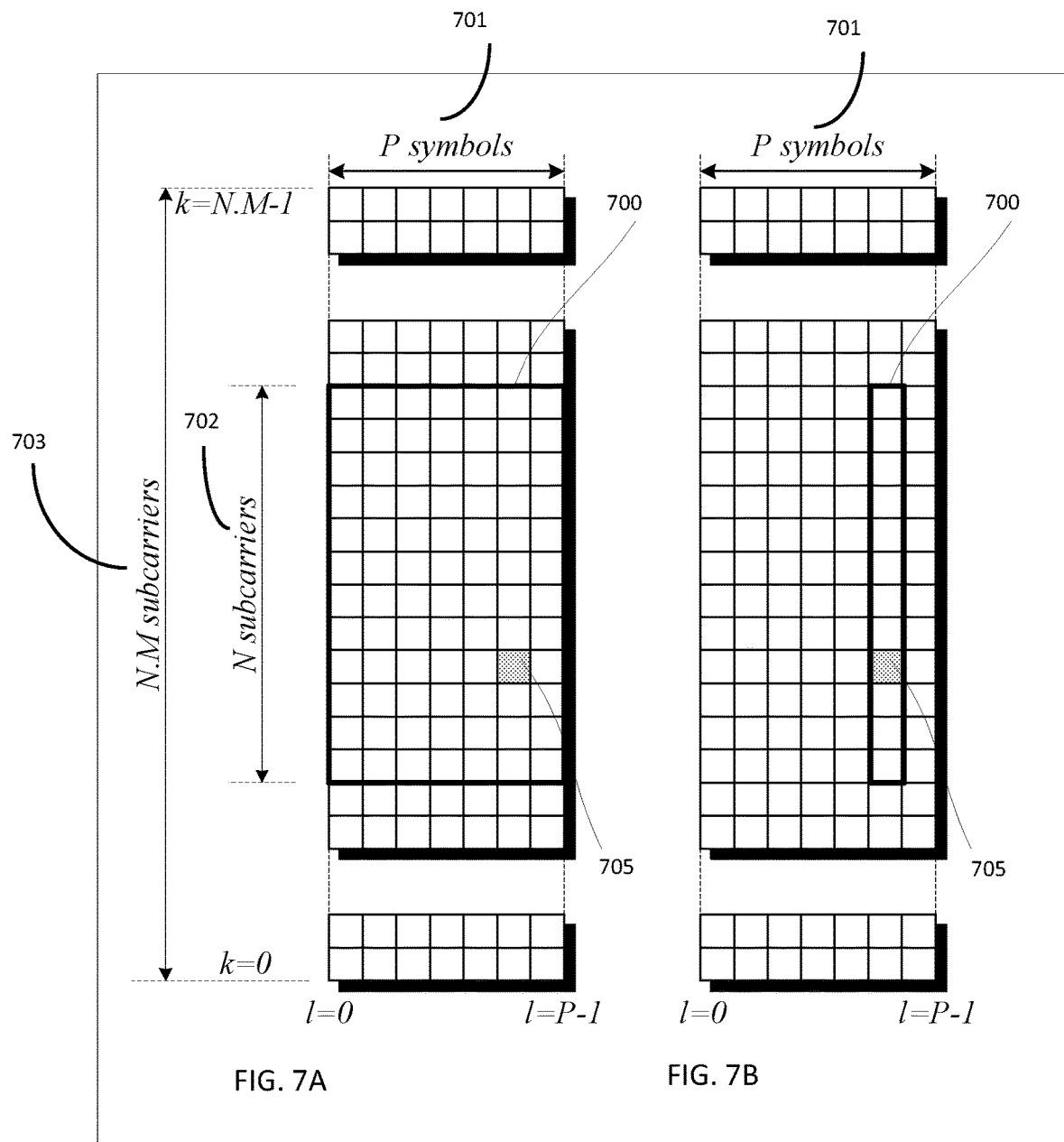
FIG. 7A and FIG. 7B illustrate example frequency resources in accordance with some embodiments.

FIG. 6 illustrates an example of a radio frame structure in accordance with some embodiments. FIGS. 7A and 7B illustrate example frequency resources in accordance with some embodiments. In references herein, "FIG. 7" may include FIG. 7A and FIG. 7B. It should be noted that the examples shown in FIGS. 6-7 may illustrate some or all of the concepts and techniques described herein in some cases, but embodiments are not limited by the examples. For instance, embodiments are not limited by the name, number, type, size, ordering, arrangement and/or other aspects of the time resources, symbol periods, frequency resources, PRBs and other elements as shown in FIGS. 6-7. Although some of the elements shown in the examples of FIGS. 6-7 may be included in a 3GPP LTE standard, 5G standard, NR standard and/or other standard, embodiments are not limited to usage of such elements that are included in standards.

An example of a radio frame structure that may be used in some aspects is shown in FIG. 6. In this example, radio frame 600 has a duration of 10 ms. Radio frame 600 is divided into slots 602 each of duration 0.5 ms, and numbered from 0 to 19. Additionally, each pair of adjacent slots 602 numbered 2i and 2i+1, where i is an integer, is referred to as a subframe 601.

In some aspects using the radio frame format of FIG. 6, each subframe 601 may include a combination of one or more of downlink control information, downlink data information, uplink control information and uplink data information. The combination of information types and direction may be selected independently for each subframe 602.

Referring to FIGS. 7A and 7B, in some aspects, a sub-component of a transmitted signal consisting of one subcarrier in the frequency domain and one symbol interval in the time domain may be termed a resource element. Resource elements may be depicted in a grid form as shown in FIG. 7A and FIG. 7B.

In some aspects, illustrated in FIG. 7A, resource elements may be grouped into rectangular resource blocks 700 consisting of 12 subcarriers in the frequency domain and the P symbols in the time domain, where P may correspond to the number of symbols contained in one slot, and may be 6, 7, or any other suitable number of symbols.

In some alternative aspects, illustrated in FIG. 7B, resource elements may be grouped into resource blocks 700 consisting of 12 subcarriers (as indicated by 702) in the frequency domain and one symbol in the time domain. In the depictions of FIG. 7A and FIG. 7B, each resource element 705 may be indexed as (k, 1) where k is the index number of subcarrier, in the range 0 to N·M−1 (as indicated by 703), where N is the number of subcarriers in a resource block, and M is the number of resource blocks spanning a component carrier in the frequency domain.

In accordance with some embodiments, a UE 102 may receive control signaling to configure transmission of: a first physical uplink control channel (PUCCH) that includes first uplink control information (UCI) of a first UCI type; and a second PUCCH that includes second UCI of a second UCI type. Candidate UCI types may include: hybrid automatic repeat request acknowledgement (HARQ-ACK), scheduling request (SR), and channel state information (CSI) report. Priorities corresponding to the candidate UCI types may be ranked in accordance with a predetermined prioritization. For transmission of the first PUCCH over more than one slot and transmission of the second PUCCH over one or more slots, if the transmissions of the first PUCCH and the second PUCCH would overlap in a number of slots, the UE 102 may, if the first UCI type and the second UCI type are not of the same priority: transmit, in the overlapping slots, the PUCCH that includes the UCI type of highest priority; and refrain from transmission in the overlapping slots, without postponement of the transmission, of the PUCCH that includes the UCI type of lowest priority. These embodiments are described in more detail below.

Figure 8:
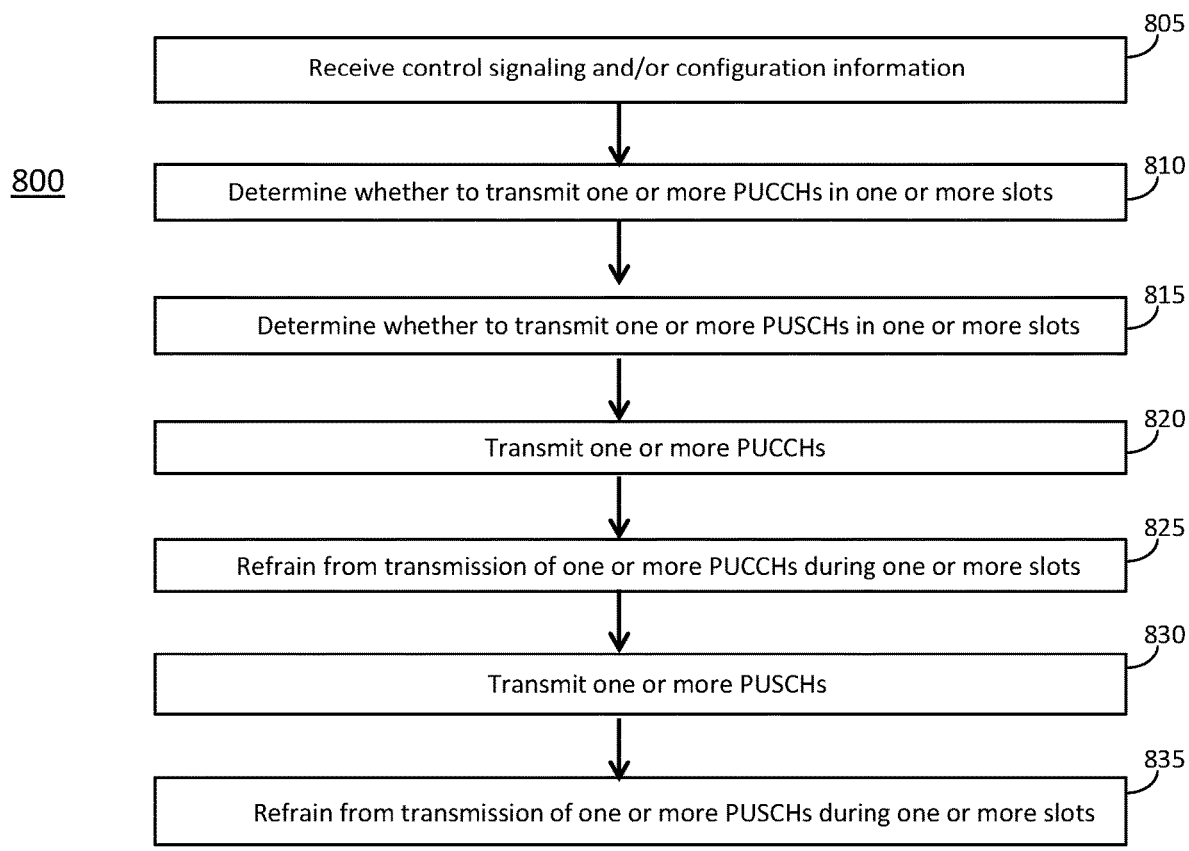
FIG. 8 illustrates the operation of a method of communication in accordance with some embodiments.
Figure 9:
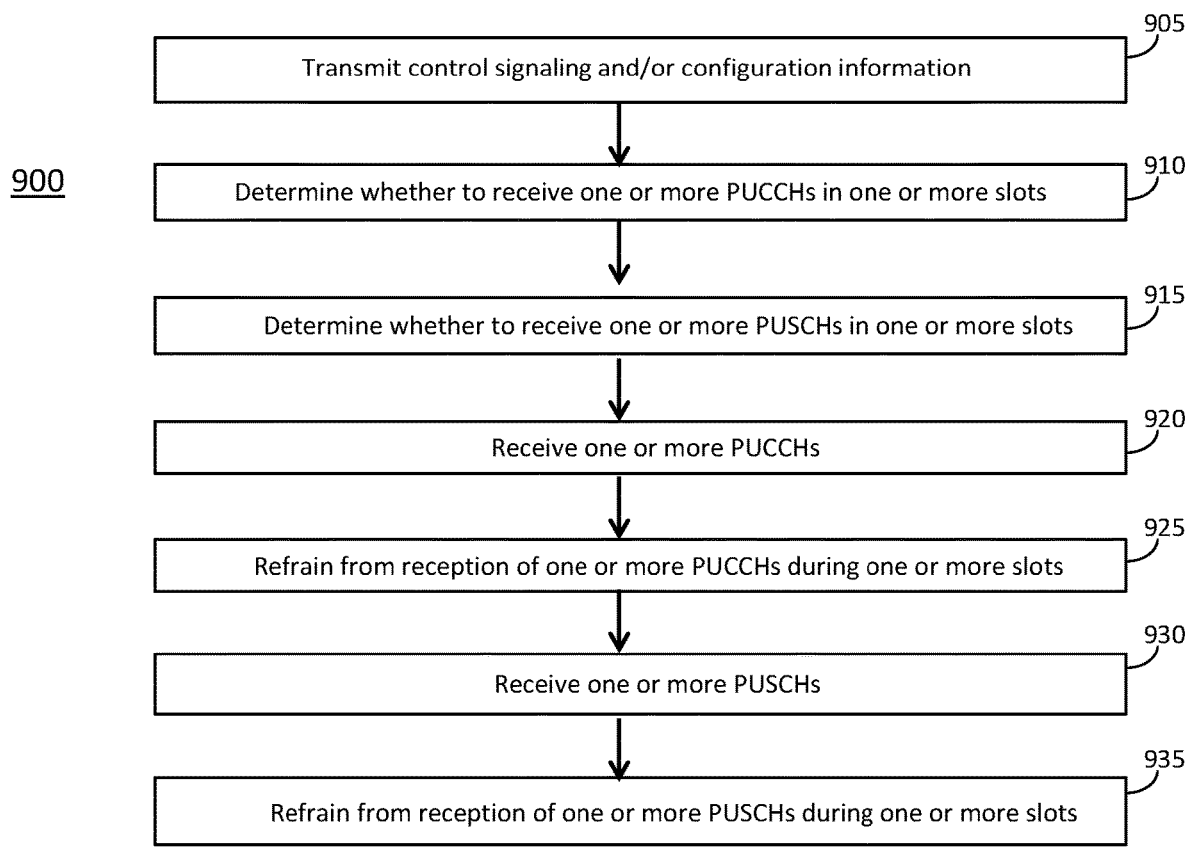
FIG. 9 illustrates the operation of another method of communication in accordance with some embodiments.

FIG. 8 illustrates the operation of a method of communication in accordance with some embodiments. FIG. 9 illustrates the operation of another method of communication in accordance with some embodiments. It is important to note that embodiments of the methods 800, 900 may include additional or even fewer operations or processes in comparison to what is illustrated in FIGS. 8-9. In addition, embodiments of the methods 800, 900 are not necessarily limited to the chronological order that is shown in FIGS. 8-9. In describing the methods 800, 900, reference may be made to one or more figures, although it is understood that the methods 800, 900 may be practiced with any other suitable systems, interfaces and components.

In some embodiments, a UE 102 may perform one or more operations of the method 800, but embodiments are not limited to performance of the method 800 and/or operations of it by the UE 102. In some embodiments, another device and/or component may perform one or more operations of the method 800. In some embodiments, another device and/or component may perform one or more operations that may be similar to one or more operations of the method 800. In some embodiments, another device and/or component may perform one or more operations that may be reciprocal to one or more operations of the method 800. In a non-limiting example, the gNB 105 may perform an operation that may be the same as, similar to, reciprocal to and/or related to an operation of the method 800, in some embodiments.

In some embodiments, a gNB 105 may perform one or more operations of the method 900, but embodiments are not limited to performance of the method 900 and/or operations of it by the gNB 105. In some embodiments, another device and/or component may perform one or more operations of the method 900. In some embodiments, another device and/or component may perform one or more operations that may be similar to one or more operations of the method 900. In some embodiments, another device and/or component may perform one or more operations that may be reciprocal to one or more operations of the method 900. In a non-limiting example, the UE 102 may perform an operation that may be the same as, similar to, reciprocal to and/or related to an operation of the method 900, in some embodiments. In another non-limiting example, the eNB 104 may perform an operation that may be the same as, similar to, reciprocal to and/or related to an operation of the method 900, in some embodiments It should be noted that one or more operations of one of the methods 800, 900 may be the same as, similar to and/or reciprocal to one or more operations of the other method. For instance, an operation of the method 800 may be the same as, similar to and/or reciprocal to an operation of the method 900, in some embodiments. In a non-limiting example, an operation of the method 800 may include reception of an element (such as a frame, block, message and/or other) by the UE 102, and an operation of the method 900 may include transmission of a same element (and/or similar element) by the gNB 105. In some cases, descriptions of operations and techniques described as part of one of the methods 800, 900 may be relevant to the other method.

Discussion of various operations, techniques and/or concepts regarding one of the methods 800, 900 and/or other method may be applicable to one of the other methods, although the scope of embodiments is not limited in this respect. Such operations, techniques and/or concepts may be related to control signaling, configuration of PUCCH transmissions, configuration of PUSCH transmissions, UCI, UCI types, prioritization of the UCI types, overlapping of slots, operations performed in different cases (including but not limited to cases in which overlapping of one or more slots used for transmissions occurs) and/or other.

The methods 800, 900 and other methods described herein may refer to eNBs 104, gNBs 105 and/or UEs 102 operating in accordance with 3GPP standards, 5G standards, NR standards and/or other standards. However, embodiments are not limited to performance of those methods by those components, and may also be performed by other devices, such as a Wi-Fi access point (AP) or user station (STA). In addition, the methods 800, 900 and other methods described herein may be practiced by wireless devices configured to operate in other suitable types of wireless communication systems, including systems configured to operate according to various IEEE standards such as IEEE 802.11. The methods 800, 900 may also be applicable to an apparatus of a UE 102, an apparatus of an eNB 104, an apparatus of a gNB 105 and/or an apparatus of another device described above.

It should also be noted that embodiments are not limited by references herein (such as in descriptions of the methods 800, 900 and/or other descriptions herein) to transmission, reception and/or exchanging of elements such as frames, messages, requests, indicators, signals or other elements. In some embodiments, such an element may be generated, encoded or otherwise processed by processing circuitry (such as by a baseband processor included in the processing circuitry) for transmission. The transmission may be performed by a transceiver or other component, in some cases. In some embodiments, such an element may be decoded, detected or otherwise processed by the processing circuitry (such as by the baseband processor). The element may be received by a transceiver or other component, in some cases. In addition, embodiments are not limited by references herein (such as in descriptions of the methods 800, 900 and/or other descriptions herein) to generation, encoding, decoding, detection and/or other processing of elements. In some embodiments, such elements may be transmitted, received and/or exchanged.

In some embodiments, the processing circuitry and the transceiver may be included in a same apparatus. The scope of embodiments is not limited in this respect, however, as the transceiver may be separate from the apparatus that comprises the processing circuitry, in some embodiments.

One or more of the elements (such as messages, operations and/or other) described herein may be included in a standard and/or protocol, including but not limited to Third Generation Partnership Project (3GPP), 3GPP Long Term Evolution (LTE), Fourth Generation (4G), Fifth Generation (5G), New Radio (NR) and/or other. Embodiments are not limited to usage of those elements, however. In some embodiments, other elements may be used, including other element(s) in a same standard/protocol, other element(s) in another standard/protocol and/or other. In addition, the scope of embodiments is not limited to usage of elements that are included in standards.

In some embodiments, the UE 102 may be arranged to operate in accordance with an NR protocol. In some embodiments, the gNB 105 may be arranged to operate in accordance with an NR protocol.

At operation 805, the UE 102 may receive control signaling and/or configuration information. In some embodiments, the control signaling and/or configuration information may be related (at least partly) to one or more of the following: physical uplink control channels (PUCCHs), uplink control information (UCI), UCI types, physical uplink shared channels (PUSCHs), time resources for PUCCHs and/or PUSCHs, frequency resources for PUCCHs and/or PUSCHs, and/or other.

In some embodiments, the UE 102 may receive control signaling that configures transmission of one or more of: a first PUCCH that includes first uplink control information (UCI) of a first UCI type, a second PUCCH that includes second UCI of a second UCI type, and/or other. In some embodiments, candidate UCI types may include one or more of: hybrid automatic repeat request acknowledgement (HARQ-ACK), scheduling request (SR), channel state information (CSI) report, and/or other. The first UCI type and the second UCI type may be included in the candidate UCI types, in some embodiments.

In some embodiments, priorities corresponding to the candidate UCI types may be ranked in accordance with a predetermined prioritization. In a non-limiting example, a priority of the HARQ-ACK may be higher than a priority of the SR, and the priority of the SR may be higher than a priority of the CSI report. In another non-limiting example, a "CSI report with higher priority" and a "CSI report with lower priority" may be supported. In this example, a priority of the HARQ-ACK may be higher than a priority of the SR, the priority of the SR may be higher than a priority of the "CSI report with higher priority," and the priority of the "CSI report with higher priority" may be higher than a priority of the "CSI report with lower priority." Embodiments are not limited to those examples in terms of the ordering (such as from highest to lowest), the elements included or other aspects. Other prioritizations may be used, in some embodiments.

It should be noted that some descriptions may refer to two PUCCHs (such as the first PUCCH and the second PUCCH), but embodiments are not limited to usage of two PUCCHs. More than two PUCCHs may be used, in some embodiments. For instance, one or more of the techniques, operations, methods and/or concepts may be described herein for cases in which two PUCCHs are used, but one or more of those techniques, operations, methods and/or concepts may be applicable to scenarios in which more than two PUCCHs are used.

At operation 810, the UE 102 may determine whether to transmit one or more PUCCHs in one or more slots. At operation 815, the UE 102 may determine whether to transmit one or more PUSCHs in one or more slots. At operation 820, the UE 102 may transmit one or more PUCCHs. At operation 825, the UE 102 may refrain from transmission of one or more PUCCHs during one or more slots. At operation 830, the UE 102 may transmit one or more PUSCHs. At operation 835, the UE 102 may refrain from transmission of one or more PUSCHs during one or more slots.

In some embodiments, for transmission of the first PUCCH over more than one slot and transmission of the second PUCCH over one or more slots, if the transmissions of the first PUCCH and the second PUCCH would overlap in a number of slots, if the first UCI type and the second UCI type are not of the same priority, the UE 102 may perform one or more of: transmit, in the overlapping slots, the PUCCH that includes the UCI type of highest priority; refrain from transmission, in the overlapping slots, of the PUCCH that includes the UCI type of lowest priority; refrain from transmission, in the overlapping slots, of the PUCCH that includes the UCI type of lowest priority without deferral; refrain from transmission, in the overlapping slots, of the PUCCH that includes the UCI type of lowest priority without deferral of transmission to any subsequent slots; refrain from transmission, in the overlapping slots, of the PUCCH that includes the UCI type of lowest priority without postponement of the transmission; and/or other.

In some embodiments, if an element (including but not limited to a PUCCH, PUSCH, a portion of a PUCCH, a portion of a PUSCH, an element related to a PUCCH, an element related to a PUSCH and/or other) is to be transmitted in a number of slots (referred to as "N" for clarity, but without limitation), postponement of the transmission may refer to postponement of transmission of the element to one or more slots that occur after the N slots.

In a non-limiting example, if an element (such as a PUCCH, PUSCH and/or other) spans N slots, if the UE 102 is to refrain from transmission of the element in M slots without postponement of the transmission (wherein M is greater than or equal to 1), the UE 102 may: refrain from transmission of the element in the M slots; and transmit the element in the other (N-M) slots. In addition, for elements and/or portions of elements that correspond to the M slots in which the UE 102 refrains from transmission, the UE 102 may refrain from transmission of those elements and/or portions of elements in slots subsequent to the N slots.

Some descriptions herein may refer to an operation in which the UE 102 refrains from transmission of an element in one or more slots. Those descriptions may or may not indicate whether the UE 102 refrains from transmission without postponement of the transmission. Embodiments are not limited by those descriptions. For instance, some descriptions may refer to an operation in which the UE 102 refrains from transmission. It is understood that in some embodiments, in the same operation or in a similar operation, the UE 102 may refrain from transmission without postponement of the transmission. In addition, some descriptions may refer to an operation in which the UE 102 refrains from transmission without postponement of the transmission. It is understood that in some embodiments, in the same operation or in a similar operation, the UE 102 may refrain from transmission (which may not necessarily be "without postponement of the transmission").

In addition, in an operation described herein, the UE 102 may refrain from transmission of an element in one or more slots with or without postponement of the transmission. It is understood that in some embodiments, in the same operation or in a similar operation, the UE 102 may refrain from transmission of the element and may postpone transmission to one or more subsequent slots.

In addition, in descriptions herein, an operation may include refraining from transmission without postponement of the transmission. It is understood that the same operation or a similar operation may include refraining from transmission without postponement of the transmission, in some embodiments.

In addition, in descriptions herein, an operation may include refraining from transmission without postponement of the transmission. It is understood that, in some embodiments, the same operation or a similar operation may include one or more of: refraining from transmission without deferral; refraining from transmission without deferral of the transmission; refraining from transmission without deferral of the transmission to any subsequent slots; refraining from transmission without deferral of the transmission to one or more subsequent slots; and/or other.

In some embodiments, if the first UCI type is of higher priority than the second UCI type, the UE 102 may perform one or more of: transmit the first PUCCH in the overlapping slots; refrain from transmission of the second PUCCH in the overlapping slots; refrain from transmission of the second PUCCH in the overlapping slots without postponement of the transmission; and/or other. In addition, if the second UCI type is of higher priority than the first UCI type, the UE 102 may perform one or more of: transmit the second PUCCH in the overlapping slots; refrain from transmission of the first PUCCH in the overlapping slots; refrain from transmission of the first PUCCH in the overlapping slots without postponement of the transmission; and/or other.

In some embodiments, in the number of slots of overlap, if the first UCI type and the second UCI type are of the same priority, the UE 102 may perform one or more of: transmit the PUCCH for which the transmission starts earliest; refrain from transmission of the PUCCH for which the transmission starts latest; refrain from transmission of the PUCCH for which the transmission starts latest without postponement of the transmission; and/or other. For instance, if one of the PUCCHs (of the first and second PUCCHs) starts before the other PUCCH, the UE 102 may transmit the PUCCH (of the first and second PUCCHs) that starts first and may refrain from transmission of the other PUCCH (of the first and second PUCCHs).

In some embodiments, the UE 102 may receive control signaling to configure a number of slots for repetition of the first or second PUCCHs. In some embodiments, the UE 102 may refrain from multiplexing of different UCI types in a PUCCH transmission if the number of slots for repetition is greater than one. In some embodiments, the UE 102 may refrain from multiplexing of different UCI types in a PUCCH transmission without postponement of the transmission if the number of slots for repetition is greater than one.

In some embodiments, the UE 102 may receive control signaling to configure transmission of a physical uplink shared channel (PUSCH). For transmission of one of the PUCCHs over a first number of slots (wherein the first number may be greater than one), and transmission of the PUSCH over a second number of slots, if the PUCCH transmission would overlap with the PUSCH transmission in one or more slots, in the overlapping slots, the UE 102 may perform one or more of: transmit the PUCCH; refrain from transmission of the PUSCH; refrain from transmission of the PUSCH without postponement of the transmission; and/or other.

In some embodiments, for transmission of positive or negative SR in a resource using PUCCH format 0 and HARQ-ACK information bits in a resource using PUCCH format 1 in a slot, the UE 102 may perform one or more of: transmit, in the resource, a PUCCH to include the HARQ-ACK information bits; refrain from transmission in the resource of PUCCHs that include the SR; and/or other.

In some embodiments, the UE 102 may receive control signaling that configures the UE 102 with overlapping resources for PUCCH transmissions or for PUCCH and PUSCH transmissions, wherein each PUCCH transmission is over a single slot without repetition. If the first PUCCH includes a HARQ-ACK or SR to be transmitted on multiple slots, and if the second PUCCH includes a CSI report to be transmitted on a single slot, and if the single slot overlaps one of the multiple slots, the UE 102 may perform one or more of: refrain from transmission of the second PUCCH; transmit the first PUCCH in the multiple slots (including the overlapping slot); and/or other. In some embodiments, the UE 102 may perform one or more of the above (such as refrain from transmission of the second PUCCH, transmission of the first PUCCH for transmission in the multiple slots and/or other) if one or more timeline criteria are satisfied. In addition, some of the other embodiments described herein may use one or more timeline criteria. For instance, one or more of the techniques, operations and/or methods described herein may be performed in accordance with one or more timeline criteria (such as performance of an operation if one or more timeline criteria are satisfied).

In a non-limiting example, a timeline criterion may be based on one or more of: a first time difference between an end time of a physical downlink shared channel (PDSCH) and a start time of a physical uplink shared channel (PUSCH); a second time difference between an end time of a physical downlink control channel (PDCCH) and the start time of the PUSCH; and/or other.

In some embodiments, if the first PUCCH includes a CSI report to be transmitted on multiple slots, and if the second PUCCH includes a HARQ-ACK or SR to be transmitted on a single slot, and if the single slot overlaps one of the multiple slots, the UE 102 may perform one or more of: refrain from transmission of the first PUCCH; refrain from transmission of the first PUCCH without postponement of the transmission; transmit the second PUCCH for transmission in the multiple slots, including the overlapping slot; and/or other.

In some embodiments, if a multi-slot PUCCH with multiple repetitions carrying HARQ-ACK feedback and a CSI report overlaps with a PUSCH repetition, wherein the PUSCH is a single slot PUSCH or a multi-slot PUSCH, the UE 102 may perform one or more of: refrain from transmission of the PUSCH in overlapping slots; refrain from transmission of the PUSCH in overlapping slots without postponement of the transmission; transmit the PUCCH in multiple slots (including the overlapping slot); and/or other.

In some embodiments, if a multi-slot PUCCH overlaps with a PUSCH repetition in one or more slots, the UE 102 may perform one or more of: refrain from transmission of the PUSCH in overlapping slots; refrain from transmission of the PUSCH in overlapping slots without postponement of the transmission; transmit the PUCCH in multiple slots (including the overlapping slot); and/or other.

In some embodiments, the UE 102 may receive control signaling to configure transmission of: a first PUCCI that includes first UCI of a first UCI type, and a second PUCCH that includes second UCI of a second UCI type. Candidate UCI types may include one or more of: HARACK, SR, CSI report, and/or other. The UE 102 may determine whether to refrain from transmission of at least a portion of the first PUCCH or the second PUCCH when transmission of the first PUCCH would overlap with transmission of the second PUCCH based on one or more of: a first priority of the first UCI type, a second priority of the second UCI type, a predetermined prioritization of the candidate UCI types, and/or other. In a non-limiting example, a priority of the HARQ-ACK is higher than a priority of the SR, and the priority of the SR is higher than a priority of the CSI report.

In some embodiments, if the first UCI type and the second UCI type are not of the same priority, the UE 102 may perform one or more of: transmit, in overlapping slots, the PUCCH that includes the UCI type of highest priority; refrain from transmission, in the overlapping slots, of the PUCCH that includes the UCI type of lowest priority; refrain from transmission without postponement of the transmission, in the overlapping slots, of the PUCCH that includes the UCI type of lowest priority; and/or other.

In some embodiments, an apparatus of a UE 102 may comprise memory. The memory may be configurable to store the first and second PUCCHs. The memory may store one or more other elements and the apparatus may use them for performance of one or more operations. The apparatus may include processing circuitry, which may perform one or more operations (including but not limited to operation(s) of the method 800 and/or other methods described herein). The processing circuitry may include a baseband processor. The baseband circuitry and/or the processing circuitry may perform one or more operations described herein, including but not limited to encoding of the first and second PUCCHs. The apparatus may include a transceiver to transmit the first and second PUCCHs. The transceiver may transmit and/or receive other blocks, messages and/or other elements.

At operation 905, the gNB 105 may transmit control signaling and/or configuration information. In some embodiments, the control signaling and/or configuration information may be related (at least partly) to one or more of the following: physical uplink control channels (PUCCHs), uplink control information (UCI), UCI types, physical uplink shared channels (PUSCHs), time resources for PUCCHs and/or PUSCHs, frequency resources for PUCCHs and/or PUSCHs, and/or other.

At operation 910, the gNB 105 may determine whether to receive one or more PUCCHs in one or more slots. At operation 915, the gNB 105 may determine whether to receive one or more PUSCHs in one or more slots. At operation 920, the gNB 105 may receive one or more PUCCHs. At operation 925, the gNB 105 may refrain from reception of one or more PUCCHs during one or more slots. At operation 930, the gNB 105 may receive one or more PUSCHs. At operation 935, the gNB 105 may refrain from reception of one or more PUSCHs during one or more slots.

In some embodiments, the gNB 105 may transmit control signaling to configure a UE for transmission of multiple PUCCHs. In some embodiments, each PUCCH may be configurable to include UCI, although the scope of embodiments is not limited in this respect. In some embodiments, one or more of the PUCCHs may be configurable to include UCI, although the scope of embodiments is not limited in this respect. In some embodiments, each UCI may be of a UCI type, although the scope of embodiments is not limited in this respect.

In some embodiments, candidate UCI types may include one or more of: HARQ-ACK, SR, CSI report and/or other. In some embodiments, a priority of the HARQ-ACK may be higher than a priority of the SR, and the priority of the SR may be higher than a priority of the CSI report. In some embodiments, other prioritizations (in terms of ordering of the priority, such as from highest to lowest) may be used.

In some embodiments, for reception of a first PUCCH over more than one slot and a second PUCCH over one or more slots, wherein the first PUCCH includes a first UCI and the second PUCCH includes a second UCI: if transmissions of the first PUCCH and the second PUCCH would overlap in a number of slots, and if the first UCI type and the second UCI type are not of the same priority, the gNB 105 may, in the overlapping slots, perform one or more of: receive the PUCCH that includes the UCI type of highest priority; refrain from reception of the UCI type of lowest priority; refrain from reception of the UCI type of lowest priority without deferral; refrain from reception of the UCI type of lowest priority without deferral of transmission to any subsequent slots; and/or other.

In some embodiments, the gNB 105 may transmit control signaling to configure transmission of a PUSCH. For transmission of a PUCCH over a first number of slots, the first number greater than one, and transmission of the PUSCH over a second number of slots, if the PUCCH transmission would overlap with the PUSCH transmission in one or more slots, the gNB 105 may, in the overlapping slots, perform one or more of: receive the PUCCH; refrain from reception of the PUSCH; refrain from reception of the PUSCH without postponement; and/or other.

In some embodiments, an apparatus of a gNB 105 may comprise memory. The memory may be configurable to store the first and second PUCCHs. The memory may store one or more other elements and the apparatus may use them for performance of one or more operations. The apparatus may include processing circuitry, which may perform one or more operations (including but not limited to operation(s) of the method 900 and/or other methods described herein). The processing circuitry may include a baseband processor. The baseband circuitry and/or the processing circuitry may perform one or more operations described herein, including but not limited to decoding of the first and second PUCCHs. The apparatus may include a transceiver to receive the first and second PUCCHs. The transceiver may transmit and/or receive other blocks, messages and/or other elements.

Figure 10:
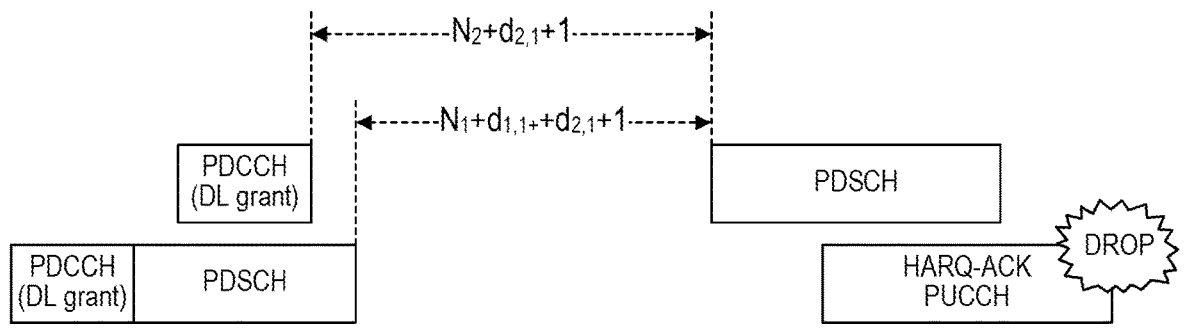
FIG. 10 illustrates an example of a timeline check for multiplexing of physical uplink control channel (PUCCH) and physical uplink shared channel (PUSCH) in accordance with some embodiments.
Figure 11:
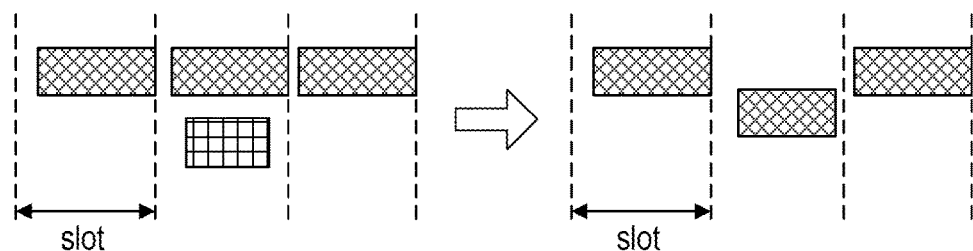
FIG. 11 illustrates an example in which a single slot PUCCH overlaps a multi-slot PUCCH repetition in accordance with some embodiments.
Figure 12:
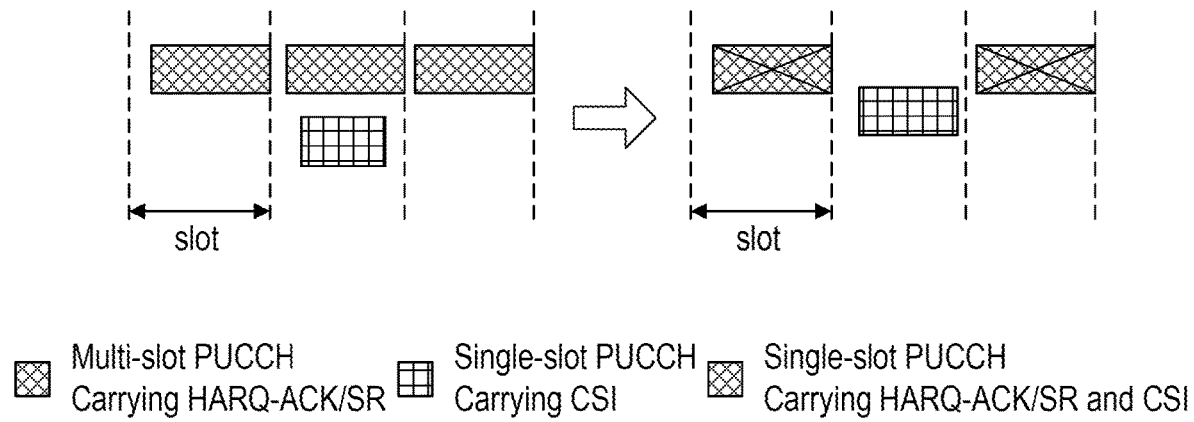
FIG. 12 illustrates an example of multiplexing a single-slot PUCCH and a multi-slot PUCCH in accordance with some embodiments.
Figure 13:
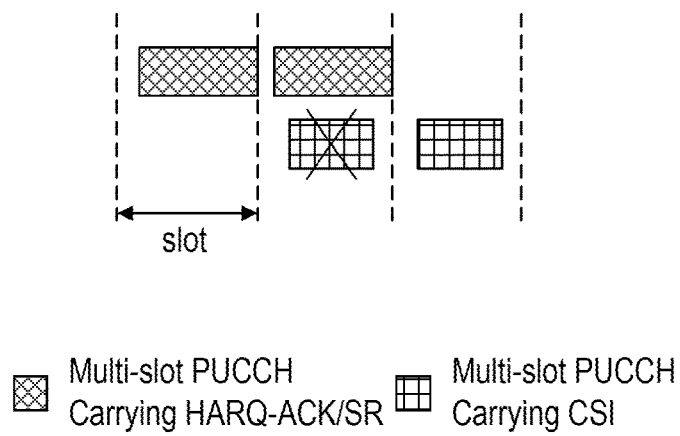
FIG. 13 illustrates an example of multiplexing a multi-slot PUCCH and another multi-slot PUCCH in accordance with some embodiments.
Figure 14:
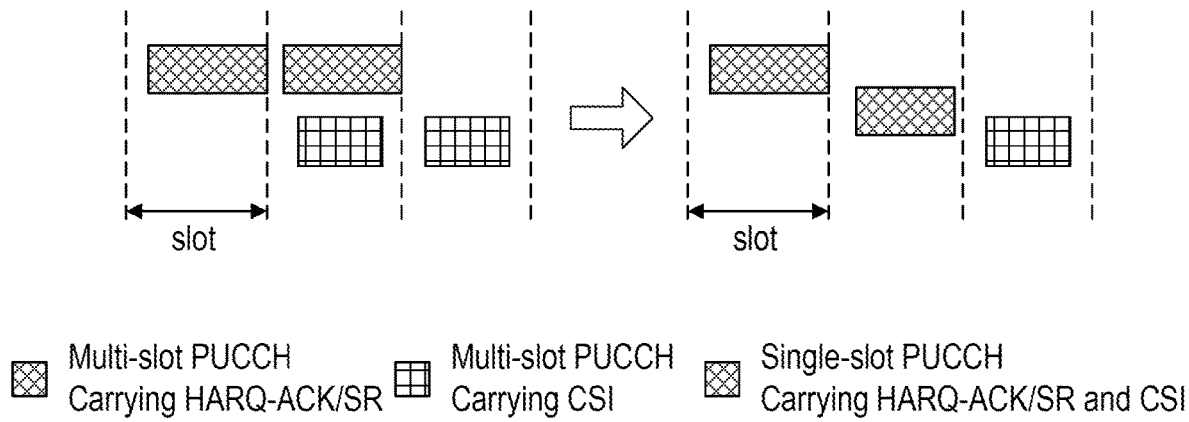
FIG. 14 illustrates an example of multiplexing a multi-slot PUCCH and another multi-slot PUCCH in accordance with some embodiments.
Figure 15:
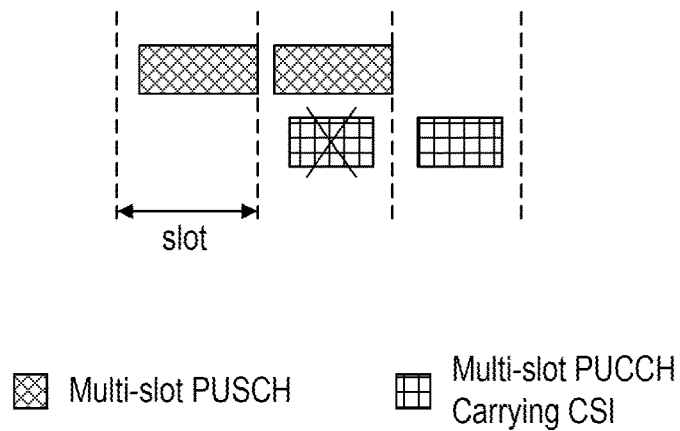
FIG. 15 illustrates an example of multiplexing a multi-slot PUCCH and another multi-slot PUSCH in accordance with some embodiments.
Figure 16:
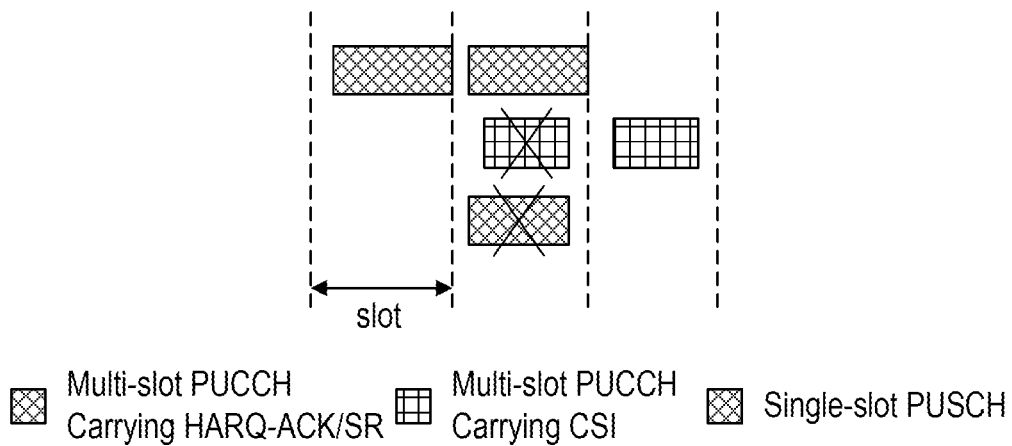
FIG. 16 illustrates an example of multiplexing multi-slot PUCCH repetitions with a PUSCH in accordance with some embodiments.
Figure 17:
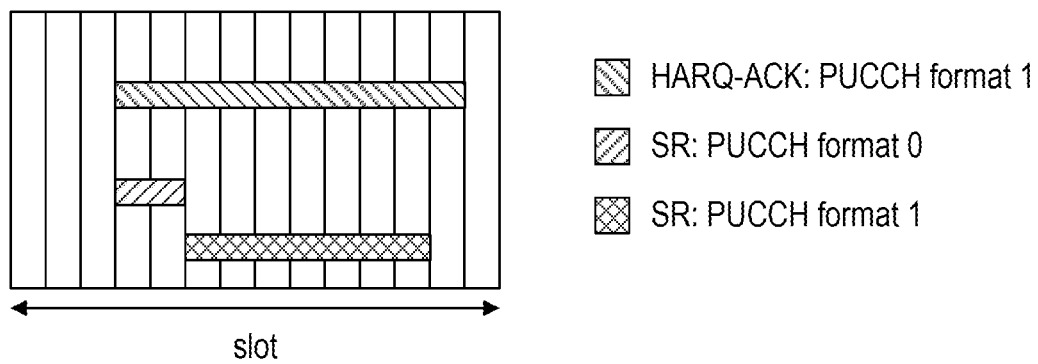
FIG. 17 illustrates an example of multiplexing hybrid automatic repeat request acknowledgement (HARQ-ACK) and multiple scheduling requests (SRs) with mixed PUCCH formats in accordance with some embodiments.
Figure 18:
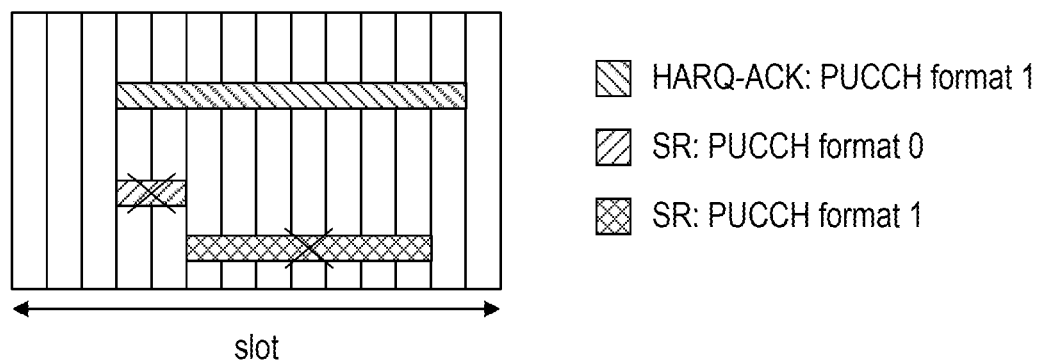
FIG. 18 illustrates an example of multiplexing HARQ-ACK and two SRs with mixed PUCCH formats in accordance with some embodiments.

FIG. 10 illustrates an example of a timeline check for multiplexing of physical uplink control channel (PUCCH) and physical uplink shared channel (PUSCH) in accordance with some embodiments. FIG. 11 illustrates an example in which a single slot PUCCH overlaps a multi-slot PUCCH repetition in accordance with some embodiments. FIG. 12 illustrates an example of multiplexing a single-slot PUCCH and a multi-slot PUCCH in accordance with some embodiments. FIG. 13 illustrates an example of multiplexing a multi-slot PUCCH and another multi-slot PUCCH in accordance with some embodiments. FIG. 14 illustrates an example of multiplexing a multi-slot PUCCH and another multi-slot PUCCH in accordance with some embodiments. FIG. 15 illustrates an example of multiplexing a multi-slot PUCCH and another multi-slot PUSCH in accordance with some embodiments. FIG. 16 illustrates an example of multiplexing multi-slot PUCCH repetitions with a PUSCH in accordance with some embodiments. FIG. 17 illustrates an example of multiplexing hybrid automatic repeat request acknowledgement (HARQ-ACK) and multiple scheduling requests (SRs) with mixed PUCCH formats in accordance with some embodiments. FIG. 18 illustrates an example of multiplexing HARQ-ACK and two SRs with mixed PUCCH formats in accordance with some embodiments.

It should be noted that the examples shown in FIGS. 10-18 may illustrate some or all of the concepts and techniques described herein in some cases, but embodiments are not limited by the examples. For instance, embodiments are not limited by the name, number, type, size, ordering, arrangement of elements (such as devices, operations, messages and/or other elements) shown in FIGS. 10-18. Although some of the elements shown in the examples of FIGS. 10-18 may be included in a 3GPP standard, 3GPP LTE standard, NR standard, 5G standard and/or other standard, embodiments are not limited to usage of such elements that are included in standards.

In some cases, including but not limited to cases related to new radio (NR) operation, short physical uplink control channel (PUCCH) (PUCCH formats 0 and 2) can span 1 or 2 symbols and long PUCCH (PUCCH formats 1, 3 and 4) can span from 4 to 14 symbols within a slot. Further, long PUCCH may span multiple slots to further enhance the coverage. In addition, for a given UE 102, two short PUCCHs as well as short PUCCH and long PUCCH can be multiplexed in a TDM manner in a same slot.

In NR, uplink control information can be carried by PUCCH or PUSCH. In particular, UCI may include scheduling request (SR), hybrid automatic repeat request-acknowledgement (HARQ-ACK) feedback, channel state information (CSI) report, e.g., channel quality indicator (CQI), pre-coding matrix indicator (PMI), CSI resource indicator (CRI) and rank indicator (RI) and/or beam related information (e.g., L1-RSRP (layer 1-reference signal received power)).

Further, it was agreed in NR that when single-slot PUCCH overlaps with single-slot PUCCH or single-slot physical uplink shared channel (PUSCH) in slot n for a PUCCH group, the UE 102 multiplex all UCIs on either one PUCCH or one PUSCH, using the existing UCI multiplexing rule, if both following conditions are satisfied: if the first symbol of the earliest PUCCH(s)/PUSCH(s) among all the overlapping channels starts no earlier than symbol ($N_1+d_{1,1}+d_{1,2}+1$) after the last symbol of PDSCH(s); and if the first symbol of the earliest PUCCH(s)/PUSCH(s) among all the overlapping channels starts no earlier than ($N_2+d_{2,1}+1$) after the last symbol of PDCCHs scheduling UL transmissions including HARQ-ACK and PUSCH (if applicable) for slot n.

If at least one pair of overlapping channels does not meet the above timeline requirements, the UE 102 may consider it is an error case for all UL channels in the group of overlapping channels. In this case, UE behavior may not necessarily be specified, in some cases. Note that the parameters $N_1$, $N_2$, $d_{1,1}$, $d_{1,2}$, and $d_{2,1}$ are processing time related parameters, which may be defined and/or included in a 3GPP standard (such as TS38.214 and/or other(s)).

FIG. 10 illustrates a non-limiting example 1000 of a timeline check for multiplexing of PUCCH and PUSCH. In the example, timeline requirement is satisfied. Hence, PUCCH carrying HARQ-ACK feedback is dropped and HARQ-ACK feedback is piggybacked on PUSCH.

In some cases, including but not limited to one or more current specifications, long PUCCH with multiple slot duration can be used to carry HARQ-ACK feedback in order to improve the link budget and extend the coverage. It is envisioned that multi-slot PUCCH can be used to carry CSI report and SR to improve the coverage for other UCI types. Hence, when single-slot or multi-slot PUCCH overlaps with multi-slot PUCCH carrying different UCI types, certain multiplexing rule needs to be defined to ensure alignment between gNB 105 and UE 102.

In some embodiments, methods of multiplexing long PUCCH with multiple slot duration carrying different UCI types may be used. In some embodiments, methods of multiplexing single-slot and/or multi-slot PUCCH/PUSCH may be used. In some embodiments, methods of multiplexing HARQ-ACK and multiple SRs with mixed PUCCH formats may be used.

In some embodiments, multiplexing of single-slot and/or multi-slot PUCCH/PUSCH may be used. In some embodiments, in NR, when single slot PUCCH overlaps with multi-slot PUSCH repetition in a slot, if the timeline requirement is met for the overlapped slot, multiplexing UCI on PUSCH in the overlapped slot; otherwise, it is considered as an error case for the overlapped slot. Further, at least for Dec drop, when multi-slot PUCCH repetitions overlap with single/multi-slot PUSCH repetition in time, dropping PUSCH without deferral in overlapping slots if the timeline requirement within overlapping slots is met; otherwise; it is considered as the error case for overlapping slots.

In some embodiments, multi-slot PUCCH can be used to carry CSI report and SR to improve the coverage for other UCI types. Hence, when single-slot or multi-slot PUCCH overlaps with multi-slot PUCCH carrying different UCI types, certain multiplexing rule needs to be defined to ensure alignment between gNB 105 and UE 102.

In some cases, methods of multiplexing single-slot and/or multi-slot PUCCH/PUSCH are provided as follows may be used. Some cases described herein may be referred to as "case 1," "case 2," "case 3," and "case 4," but such references are not limiting. In addition, embodiments described for one or more cases are not limited to just those cases. One or more techniques, operations, methods and/or concepts described for one case may be applicable to one or more other cases, in some embodiments.

In case 1, a single slot PUCCH carrying CSI report may overlap with multi-slot PUCCH repetition carrying HARQ-ACK and/or SR in a slot. In some embodiments, within a PUCCH group, when single slot PUCCH carrying CSI report overlaps with multi-slot PUCCH repetition carrying HARQ-ACK and/or SR in a slot, if the timeline requirement is satisfied for the overlapped slot, CSI report is multiplexed with HARQ-ACK and/or SR in the overlapped slot in accordance with the multiplexing rule as defined for multiplexing of HARQ-ACK and/or SR and CSI in single-slot PUCCH; otherwise, it is considered as an error case for the overlapped slot. In some embodiments, the same principle (and/or similar principle) can be applied for the case when single slot PUCCH carrying HARQ-ACK/SR overlaps with multi-slot PUCCH repetition carrying CSI report in a slot. A non-limiting example 1100 is shown in FIG. 11. In some embodiments, for multi-slot PUCCH, the PUCCH in other non-overlapping slot may not be transmitted. FIG. 12 illustrates a non-limiting example 1200 for multiplexing single-slot PUCCH carrying CSI and multi-slot PUCCH carrying HARQ-ACK/SR.

In some embodiments, within a PUCCH group, when single slot PUCCH carrying CSI report overlaps with multi-slot PUCCH repetition carrying HARQ-ACK and/or SR in a slot, if the timeline requirement is satisfied for the overlapped slot, CSI report on PUCCH is dropped and UE 102 transmits HARQ-ACK and/or SR on the corresponding PUCCH resource; otherwise it is considered as an error case for the overlapped slot. In some embodiments, the same principle (and/or similar principle) can be applied for the case when single slot PUCCH carrying HARQ-ACK/SR overlaps with multi-slot PUCCH repetition carrying CSI report in a slot. Alternatively, when single slot PUCCH HARQ-ACK and/or SR overlaps with multi-slot PUCCH repetition carrying CSI in a slot, if the timeline requirement is satisfied for the overlapped slot, CSI report on PUCCH is dropped and UE 102 transmits HARQ-ACK and/or SR on the corresponding PUCCH resource; otherwise it is considered as an error case for the overlapped slot.

In case 2, a multi-slot PUCCH carrying CSI report may overlap with multi-slot PUCCH repetition carrying HARQ-ACK and/or SR in time. In some embodiments, within a PUCCH group, when multi-slot PUCCH carrying CSI report overlaps with multi-slot PUCCH repetition carrying HARQ-ACK and/or SR in time, if the timeline requirement within overlapping slots is satisfied, CSI report on PUCCH for the overlapped slots is dropped without deferral and UE 102 transmits the HARQ-ACK and/or SR on the corresponding PUCCH resource on the overlapped slots; otherwise it is considered as an error case for the overlapped slot. In some embodiments, alternatively, the whole multi-slot PUCCH carrying CSI may be dropped.

In some embodiments, multiplexing multi-slot PUCCH carrying CSI and multi-slot PUCCH carrying HARQ-ACK/SR may be used, of which a non-limiting example 1300 is shown in FIG. 13. The technique shown in FIG. 13 may be referred to for clarity, and without limitation, as "option 1." In the example 1300, in the overlapped slot ($2^{nd}$ slot as shown in the figure), PUCCH carrying CSI report is dropped and UE transmits HARQ-ACK/SR on the corresponding PUCCH resource.

In some embodiments, within a PUCCH group, when multi-slot PUCCH carrying CSI report overlaps with multi-slot PUCCH repetition carrying HARQ-ACK and/or SR in time, if the timeline requirement within overlapping slots is satisfied, CSI report is multiplexed with HARQ-ACK and/or SR for the overlapped slots in accordance with the multiplexing rule as defined for multiplexing of HARQ-ACK and/or SR and CSI in single-slot PUCCH; otherwise, it is considered as an error case for the overlapped slot. In some embodiments, alternatively, the multi-slot PUCCH in other non-overlapping slot may be dropped.

In some embodiments, multiplexing multi-slot PUCCH carrying CSI and multi-slot PUCCH carrying HARQ-ACK/SR may be used, of which a non-limiting example 1400 is shown in FIG. 14. The technique shown in FIG. 14 may be referred to for clarity, and without limitation, as "option 2." In the example 1400, in the overlapped slot ($2^{nd}$ slot as shown in the figure), CSI report is multiplexed with HARQ-ACK and/or SR using a new PUCCH resource.

In case 3, multi-slot PUCCH repetitions carrying CSI report may overlap with single/multi-slot PUSCH repetition in time. In some embodiments, within a PUCCH group, when multi-slot PUCCH repetitions carrying CSI report only overlap with single/multi-slot PUSCH repetition in time, PUCCH carrying CSI report is dropped without deferral and PUSCH without multiplexing CSI report is transmitted in overlapping slots if the timeline requirement within overlapping slots is met; otherwise; it is considered as the error case for overlapping slots. Alternatively, the multi-slot PUCCH in other non-overlapping slot may be dropped.

FIG. 15 illustrates a non-limiting example 1500 of multiplexing multi-slot PUCCH carrying CSI and multi-slot PUSCH. In the example 1500, in the overlapped slot ($2^{nd}$ slot as shown in the figure), PUCCH carrying CSI report is dropped and UE 102 transmits PUSCH only.

In some embodiments, within a PUCCH group, when multi-slot PUCCH repetitions carrying CSI report only overlap with single/multi-slot PUSCH repetition in time, PUCCH carrying CSI report is dropped without deferral in overlapping slots and CSI report is multiplexed on the PUSCH if the timeline requirement within overlapping slots is met; otherwise; it is considered as the error case for overlapping slots.

In case 4, multi-slot PUCCH repetitions carrying HARQ-ACK and CSI report may overlap with single/multi-slot PUSCH repetition in time. In some embodiments, within a PUCCH group, when multi-slot PUCCH repetitions carrying HARQ-ACK feedback and CSI report overlap with single/multi-slot PUSCH repetition in time, in the first step, multiplexing of PUCCH carrying HARQ-ACK feedback and PUCCH carrying CSI report in the overlapped slots is performed first, wherein the multiplexing rule can be based on the aforementioned embodiments; in the second step, multiplexing of PUCCH and PUSCH in the overlapped slots is performed.

In some embodiments, within a PUCCH group, when multi-slot PUCCH repetitions carrying HARQ-ACK feedback and CSI report overlap with single/multi-slot PUSCH repetition in time, PUSCH is dropped without deferral and PUCCH carrying both HARQ-ACK feedback and CSI report is transmitted in overlapping slots if the timeline requirement within overlapping slots is met; otherwise; it is considered as the error case for overlapping slots.

In some embodiments, when multi-slot PUCCH repetitions carrying HARQ-ACK feedback and CSI report overlap with single/multi-slot PUSCH repetition in time, PUCCH carrying both HARQ-ACK feedback and CSI report are dropped and a combined UCI including HARQ-ACK and CSI report is piggybacked on PUSCH in overlapping slots if the timeline requirement within overlapping slots is met; otherwise; it is considered as the error case for overlapping slots.

In some embodiments, within a PUCCH group, when multi-slot PUCCH repetitions carrying HARQ-ACK feedback and CSI report overlap with single/multi-slot PUSCH repetition in time, PUCCH(s) carrying HARQ-ACK feedback and CSI report are dropped without deferral in overlapping slots and UE 102 only transmits PUSCH without multiplexing of HARQ-ACK and CSI report if the timeline requirement within overlapping slots is met; otherwise; it is considered as the error case for overlapping slots.

In some embodiments, within a PUCCH group, when multi-slot PUCCH repetitions carrying HARQ-ACK feedback and CSI report overlap with single/multi-slot PUSCH repetition in time, PUSCH and PUCCH carrying CSI report are dropped without deferral and PUCCH carrying HARQ-ACK feedback only on the corresponding PUCCH resource is transmitted in overlapping slots if the timeline requirement within overlapping slots is met; otherwise; it is considered as the error case for overlapping slots.

FIG. 16 illustrates a non-limiting example 1600 of multiplexing of multi-slot PUCCH repetitions carrying HARQ-ACK and CSI report overlap with single/multi-slot PUSCH repetition in time. In the example 1600, in the overlapped slot ($2^{nd}$ slot as shown in the figure), PUCCH carrying CSI report and PUSCH are dropped and UE 102 transmits PUCCH carrying HARQ-ACK feedback.

In some embodiments, for a subset of or all of the cases from case 1 to case 4, UE 102 shall expect such case(s) should not happen, regardless whether the timeline requirement is satisfied for the overlapped slot or not.

In some embodiments, multiplexing HARQ-ACK and multiple SRs with mixed PUCCH formats may be used. In some embodiments, in NR, when HARQ-ACK and SR transmission overlap in time, one or more of the following (A, B, C) may be used. A) If a HARQ-ACK transmission from a UE 102 using PUCCH format 1 overlaps with SR transmission occasions corresponding to K SR PUCCH configurations each using PUCCH format 1 in a slot, in case of negative SR, the HARQ-ACK is transmitted on the HARQ-ACK resource. In case of positive SR, the HARQ-ACK is transmitted on the SR resource corresponding to the positive SR. B) If a HARQ-ACK transmission from a UE 102 using PUCCH format 0 overlaps with SR transmission occasions corresponding to K SR PUCCH configurations, in a slot, if any SR is positive, indicate positive SR; else indicate negative SR. C) When HARQ-ACK PUCCH resource with PUCCH Format 1 overlaps with SR PUCCH resource with PUCCH Format 0 in a slot, the UE transmits only HARQ-ACK in the HARQ-ACK PUCCH resource (i.e., the UE 102 does not transmit SR if it is positive).

In FIG. 17, a non-limiting example 1700 of multiplexing HARQ-ACK and multiple SRs with mixed PUCCH formats is shown. As shown in FIG. 17, when HARQ-ACK PUCCH resource with PUCCH format 1 overlaps with SR transmission occasions corresponding to K SR PUCCH configurations, with a mixed PUCCH format 0 and format 1 for SR resource, multiplexing rule for HARQ-ACK and SR needs to be defined.

In some embodiments, multiplexing HARQ-ACK and multiple SRs with mixed PUCCH formats may be used. In some embodiments, within a PUCCH group, when HARQ-ACK PUCCH resource with PUCCH format 1 overlaps in time with SR transmission occasions corresponding to K SR PUCCH configurations, with a mixed PUCCH format 0 and format 1 for SR resource, the UE transmits only HARQ-ACK in the HARQ-ACK PUCCH resource. In other words, the UE does not transmit SR regardless of whether positive or negative SR among K SR transmission occasions.

In some embodiments, multiplexing HARQ-ACK and two SRs with mixed PUCCH formats may be used, of which a non-limiting example 1800 is shown in FIG. 18. The example 1800 illustrates dropping SR when multiplexing with HARQ-ACK with PUCCH format 1. In the example 1800, in case of overlapping, SR transmission is dropped and UE 102 only transmits HARQ-ACK in the HARQ-ACK PUCCH resource.

In some embodiments, within a PUCCH group, when HARQ-ACK PUCCH resource with PUCCH format 1 overlaps in time with SR transmission occasions corresponding to K SR PUCCH configurations, with a mixed PUCCH format 0 and format 1 for SR resource, in case of positive SR using PUCCH format 1, the HARQ-ACK is transmitted on the SR resource corresponding to the positive SR. In case of negative SR, the HARQ-ACK is transmitted on the HARQ-ACK resource.

Non-limiting Examples are given below. Some embodiments may include subject matter of one or more of the Examples. Some embodiments may include subject matter from one or more of the Examples. Some embodiments may include at least a portion of the subject matter from each of one or more of the Examples.

In Example 1, a system and/or method of wireless communication for a fifth generation (5G) or new radio (NR) system may be used. The UE 102 may determine and/or use a multiplexing rule when a multiple-slot physical uplink control channel (PUCCH) carrying channel state information (CSI) report overlaps with single-slot or multiple-slot PUCCH carrying hybrid automatic repeat request-acknowledgement (HARQ-ACK). The UE 102 may transmit HARQ-ACK and CSI report in a single PUCCH resource in the overlapped slot(s) if the timeline requirement is satisfied for the overlapped slot.

In Example 2, the subject matter of Example 1 may be used, wherein within a PUCCH group, when single slot PUCCH carrying CSI report overlaps with multi-slot PUCCH repetition carrying HARQ-ACK and/or SR in a slot, if the timeline requirement is satisfied for the overlapped slot, CSI report is multiplexed with HARQ-ACK and/or SR in the overlapped slot in accordance with the multiplexing rule as defined for multiplexing of HARQ-ACK and/or SR and CSI in single-slot PUCCH; otherwise, it is considered as an error case for the overlapped slot.

In Example 3, the subject matter of one or more of Examples 1-2 may be used, wherein within a PUCCH group, when single slot PUCCH carrying CSI report overlaps with multi-slot PUCCH repetition carrying HARQ-ACK and/or SR in a slot, if the timeline requirement is satisfied for the overlapped slot, CSI report on PUCCH is dropped and UE transmits HARQ-ACK and/or SR on the corresponding PUCCH resource; otherwise it is considered as an error case for the overlapped slot.

In Example 4, the subject matter of one or more of Examples 1-3 may be used, wherein within a PUCCH group, when multi-slot PUCCH carrying CSI report overlaps with multi-slot PUCCH repetition carrying HARQ-ACK and/or SR in time, if the timeline requirement within overlapping slots is satisfied, CSI report on PUCCH for the overlapped slots is dropped without deferral and UE 102 transmits the HARQ-ACK and/or SR on the corresponding PUCCH resource on the overlapped slots; otherwise it is considered as an error case for the overlapped slot.

In Example 5, the subject matter of one or more of Examples 1~4 may be used, wherein when multi-slot PUCCH carrying CSI report overlaps with multi-slot PUCCH repetition carrying HARQ-ACK and/or SR in time, if the timeline requirement within overlapping slots is satisfied, CSI report is multiplexed with HARQ-ACK and/or SR for the overlapped slots in accordance with the multiplexing rule as defined for multiplexing of HARQ-ACK and/or SR and CSI in single-slot PUCCH; otherwise, it is considered as an error case for the overlapped slot.

In Example 6, the subject matter of one or more of Examples 1-5 may be used, wherein within a PUCCH group, when multi-slot PUCCH repetitions carrying CSI report only overlap with single/multi-slot PUSCH repetition in time, PUCCH carrying CSI report is dropped without deferral and PUSCH without multiplexing CSI report is transmitted in overlapping slots if the timeline requirement within overlapping slots is met; otherwise; it is considered as the error case for overlapping slots.

In Example 7, the subject matter of one or more of Examples 1-6 may be used, wherein within a PUCCH group, when multi-slot PUCCH repetitions carrying CSI report only overlap with single/multi-slot PUSCH repetition in time, PUCCH carrying CSI report is dropped without deferral in overlapping slots and CSI report is multiplexed on the PUSCH if the timeline requirement within overlapping slots is met; otherwise; it is considered as the error case for overlapping slots.

In Example 8, the subject matter of one or more of Examples 1-7 may be used, wherein within a PUCCH group, when multi-slot PUCCH repetitions carrying HARQ-ACK feedback and CSI report overlap with single/multi-slot PUSCH repetition in time, PUSCH is dropped without deferral and PUCCH carrying both HARQ-ACK feedback and CSI report is transmitted in overlapping slots if the timeline requirement within overlapping slots is met; otherwise; it is considered as the error case for overlapping slots.

In Example 9, the subject matter of one or more of Examples 1-8 may be used, wherein within a PUCCH group, when multi-slot PUCCH repetitions carrying HARQ-ACK feedback and CSI report overlap with single/multi-slot PUSCH repetition in time, PUCCH(s) carrying HARQ-ACK feedback and CSI report are dropped without deferral in overlapping slots and UE 102 only transmits PUSCH without multiplexing of HARQ-ACK and CSI report if the timeline requirement within overlapping slots is met; otherwise; it is considered as the error case for overlapping slots.

In Example 10, the subject matter of one or more of Examples 1-9 may be used, wherein within a PUCCH group, when multi-slot PUCCH repetitions carrying HARQ-ACK feedback and CSI report overlap with single/multi-slot PUSCH repetition in time, PUSCH and PUCCH carrying CSI report are dropped without deferral and PUCCH carrying HARQ-ACK feedback only on the corresponding PUCCH resource is transmitted in overlapping slots if the timeline requirement within overlapping slots is met; otherwise; it is considered as the error case for overlapping slots.

In Example 11, the subject matter of one or more of Examples 1-10 may be used, wherein within a PUCCH group, when HARQ-ACK PUCCH resource with PUCCH format 1 overlaps in time with SR transmission occasions corresponding to K SR PUCCH configurations, with a mixed PUCCH format 0 and format 1 for SR resource, the UE transmits only HARQ-ACK in the HARQ-ACK PUCCH resource. In other words, the UE does not transmit SR regardless of whether positive or negative SR among K SR transmission occasions.

In Example 12, the subject matter of one or more of Examples 1-11 may be used, wherein within a PUCCH group, when HARQ-ACK PUCCH resource with PUCCH format 1 overlaps in time with SR transmission occasions corresponding to K SR PUCCH configurations, with a mixed PUCCH format 0 and format 1 for SR resource, in case of positive SR using PUCCH format 1, the HARQ-ACK is transmitted on the SR resource corresponding to the positive SR. In case of negative SR, the HARQ-ACK is transmitted on the HARQ-ACK resource.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. An apparatus, comprising:
   at least one processor configured to cause a user equipment (UE) to:
   determine transmission of:
   a first physical uplink control channel (PUCCH) that includes first uplink control information (UCI) of a first UCI type, and
   a second PUCCH that includes second UCI of a second UCI type,
   wherein candidate UCI types include: hybrid automatic repeat request acknowledgement (HARQ- ACK), scheduling request (SR), and channel state information (CSI) report,
wherein for transmission of the first PUCCH over multiple slots and transmission of the second PUCCH on a single slot, if the transmissions of the first PUCCH and the second PUCCH would overlap in the single slot of the multiple slots and a timeline criterion is satisfied, the at least one processor is further configured to:
encode, for transmission in the overlapping slot, a PUCCH of the first and second PUCCHs that includes the HARQ-ACK or SR; and
refrain from transmitting a PUCCH of the first and second PUCCHs that includes the CSI report in the overlapping slot,
wherein the timeline criterion is based on:
a first time difference between an end time of a physical downlink shared channel (PDSCH) and a start time of one of the first and second PUCCHs, and a second time difference between an end time of a physical downlink control channel (PDCCH) and the start time of the one of the first and second PUCCHs.

2. The apparatus of claim 1, wherein for a prioritization of the candidate UCI types:
a priority of the HARQ-ACK is higher than a priority of the SR, and
the priority of the SR is higher than a priority of the CSI report.

3. The apparatus of claim 1, wherein the at least one processor is further configured to:
in a number of slots of overlap, if the first UCI type and the second UCI type are of the same priority:
transmit the PUCCH for which the transmission starts earliest; and
refrain from transmission of the PUCCH for which the transmission starts latest without deferral of the transmission.

4. The apparatus of claim 1, wherein the at least one processor is further configured to:
receive control signaling to configure a number of slots for repetition of the first or second PUCCHs; and
refrain from multiplexing of different UCI types in a PUCCH transmission if the number of slots for repetition is greater than one without deferral of the transmission.

5. The apparatus of claim 1, wherein the at least one processor is further configured to:
receive control signaling to configure transmission of a physical uplink shared channel (PUSCH); and
for transmission of one of the PUCCHs over a first number of slots, the first number greater than one, and transmission of the PUSCH over a second number of slots, if the PUCCH transmission would overlap with the PUSCH transmission in one or more slots,
in the overlapping slots:
transmit the PUCCH; and
refrain from transmission of the PUSCH without deferral of the transmission.

6. The apparatus of claim 1, wherein the at least one processor is further configured to:
for transmission of positive or negative SR in a resource using PUCCH format 0 and HARQ-ACK information bits in a resource using PUCCH format 1 in a slot:
transmit, in the resource, a PUCCH to include the HARQ-ACK information bits; and
refrain from transmission in the resource of PUCCHs that include the SR without deferral of the transmission.

7. The apparatus of claim 6, the at least one processor is further configured to:
decode control signaling that configures the UE with overlapping resources for PUCCH transmissions or for PUCCH and PUSCH transmissions, and each PUCCH transmission is over a single slot without repetition.

8. The apparatus of claim 1, wherein:
if the first PUCCH includes a CSI report to be transmitted on multiple slots,
if the second PUCCH includes a HARQ-ACK or SR to be transmitted on a single slot, and
if the single slot overlaps one of the multiple slots,
the at least one processor is further configured to:
refrain from transmission of the first PUCCH without deferral of the transmission; and
transmit the second PUCCH in the multiple slots, including the overlapping slot.

9. The apparatus of claim 1, wherein:
if a multi-slot PUCCH with multiple repetitions carrying HARQ-ACK feedback and a CSI report overlaps with a PUSCH repetition, wherein the PUSCH is a single slot PUSCH or a multi-slot PUSCH, the at least one processor is further configured to:
refrain from transmission of the PUSCH in overlapping slots without deferral of the transmission; and
transmit the PUCCH in multiple slots, including the overlapping slot.

10. The apparatus of claim 1, wherein:
if a multi-slot PUCCH overlaps with a PUSCH repetition in one or more slots, the at least one processor is further configured to:
refrain from transmission of the PUSCH in overlapping slots without deferral of the transmission; and
transmit the PUCCH in multiple slots, including the overlapping slot.

11. The apparatus of claim 1, wherein the UE is arranged to operate in accordance with a new radio (NR) protocol.

12. The apparatus of claim 1, wherein:
the at least one processor includes a baseband processor to transmit the first and second PUCCHs,
the apparatus further comprises a transceiver to transmit the first and second PUCCHs.

13. A method, comprising:
by a base station (BS):
for reception of a first physical uplink control channel (PUCCH) over multiple slots and a second PUCCH on a single slot, wherein the first PUCCH includes a first UCI and the second PUCCH includes a second UCI, wherein candidate UCI types include:
hybrid automatic repeat request acknowledgement (HARQ-ACK), scheduling request (SR), and channel state information (CSI) report:
if transmissions of the first PUCCH and the second PUCCH would overlap in the single slot of the multiple slots, and a timeline criterion is satisfied, in the single slot:
receiving, in the single slot, a transmission of the PUCCH of the first and second PUCCHs that includes the HARQ-ACK or SR; and
not receiving a PUCCH of the first and second PUCCHs that includes the CSI report in the single slot,
wherein the timeline criterion is based on:

a first time difference between an end time of a physical downlink shared channel (PDSCH) and a start time of one of the first and second PUCCHs, and a second time difference between an end time of a physical downlink control channel (PDCCH) and the start time of the one of the first and second PUCCHs.

14. The method of claim 13, further comprising:
transmitting control signaling to configure transmission of a physical uplink shared channel (PUSCH); and
for transmission of one of the PUCCHs over a first number of slots, the first number greater than one, and transmission of the PUSCH over a second number of slots, if the PUCCH transmission would overlap with the PUSCH transmission in one or more slots,
in the overlapping slots:
   decoding the PUCCH; and
   refraining from decoding of the PUSCH without deferral of the decoding.

15. A method, comprising:
receiving control signaling to configure transmission of:
   a first physical uplink control channel (PUCCH) that includes first uplink control information (UCI) of a first UCI type, and
   a second PUCCH that includes second UCI of a second UCI type,
   wherein candidate UCI types include: hybrid automatic repeat request acknowledgement (HARQ-ACK), scheduling request (SR), and channel state information (CSI) report,
wherein for transmission of the first PUCCH over multiple slots and transmission of the second PUCCH on a single slot, if the transmissions of the first PUCCH and the second PUCCH would overlap in the single slot of the multiple slots and a timeline criterion is satisfied, the at least one processor is further configured to:
   transmitting, in the overlapping slot, a PUCCH of the first and second PUCCHs that includes the HARQ-ACK or SR; and
   determining not to transmit a PUCCH of the first and second PUCCHs that includes the CSI report in the overlapping slot,
wherein the timeline criterion is based on:
   a first time difference between an end time of a physical downlink shared channel (PDSCH) and a start time of one of the first and second PUCCHs, and a second time difference between an end time of a physical downlink control channel (PDCCH) and the start time of the one of the first and second PUCCHs.

16. The method of claim 15, wherein for a prioritization of the candidate UCI types:
   a priority of the HARQ-ACK is higher than a priority of the SR, and
   the priority of the SR is higher than a priority of the CSI report.

17. The method of claim 15, further comprising:
in the number of slots of overlap, if the first UCI type and the second UCI type are of the same priority:
   transmitting the PUCCH for which the transmission starts earliest; and
   refraining from transmission of the PUCCH for which the transmission starts latest without deferral of the transmission.

18. The method of claim 15, further comprising:
receiving control signaling to configure a number of slots for repetition of the first or second PUCCHs; and
refraining from multiplexing of different UCI types in a PUCCH transmission if the number of slots for repetition is greater than one without deferral of the transmission.

19. The method of claim 15, further comprising:
receiving control signaling to configure transmission of a physical uplink shared channel (PUSCH); and
for transmission of one of the PUCCHs over a first number of slots, the first number greater than one, and transmission of the PUSCH over a second number of slots, if the PUCCH transmission would overlap with the PUSCH transmission in one or more slots,
in the overlapping slots:
   transmitting the PUCCH; and
   refraining from transmission of the PUSCH without deferral of the transmission.

20. The method of claim 15, further comprising:
for transmission of positive or negative SR in a resource using PUCCH format 0 and HARQ-ACK information bits in a resource using PUCCH format 1 in a slot:
   transmitting, in the resource, a PUCCH to include the HARQ-ACK information bits; and
   refraining from transmission in the resource of PUCCHs that include the SR without deferral of the transmission.

* * * * *

UNITED STATES PATENT AND TRADEMARK OFFICE
CERTIFICATE OF CORRECTION

PATENT NO. : 11,659,625 B2
APPLICATION NO. : 17/238933
DATED : May 23, 2023
INVENTOR(S) : Gang Xiong et al.

It is certified that error appears in the above-identified patent and that said Letters Patent is hereby corrected as shown below:

In the Claims

Column 30, Line 5, delete "decoded;" and insert --receive--.

Column 31, Line 14, delete "decoding" and insert --receiving--.

Signed and Sealed this
Twenty-fourth Day of October, 2023

Katherine Kelly Vidal
*Director of the United States Patent and Trademark Office*